United States Patent
Liao et al.

(10) Patent No.: US 12,368,477 B2
(45) Date of Patent: Jul. 22, 2025

(54) COORDINATED TRANSMISSION CONTROL METHOD, APPARATUS, AND SYSTEM

(71) Applicant: HUAWEI TECHNOLOGIES CO., LTD., Shenzhen (CN)

(72) Inventors: Xiangbai Liao, Wuhan (CN); Yingzhuang Liu, Wuhan (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/317,619

(22) Filed: May 15, 2023

(65) Prior Publication Data
US 2023/0283330 A1    Sep. 7, 2023

Related U.S. Application Data

(63) Continuation of application No. 16/931,551, filed on Jul. 17, 2020, now Pat. No. 11,683,077, which is a
(Continued)

(30) Foreign Application Priority Data

Jan. 19, 2018    (CN) .......................... 201810054522.8

(51) Int. Cl.
   *H04B 7/0456*      (2017.01)
   *H04B 7/06*        (2006.01)
   (Continued)

(52) U.S. Cl.
   CPC ......... *H04B 7/0456* (2013.01); *H04B 7/0617* (2013.01); *H04L 5/0073* (2013.01);
   (Continued)

(58) Field of Classification Search
   CPC ... H04B 7/0456; H04B 7/0617; H04L 5/0073; H04L 25/0202; H04W 24/08; H04W 28/18
   See application file for complete search history.

(56) References Cited

U.S. PATENT DOCUMENTS 9,385,793 B2    7/2016    Harel et al.
9,451,624 B2    9/2016    Sadek
(Continued)

FOREIGN PATENT DOCUMENTS

CN    102547910 A    7/2012
CN    104811285 A    7/2015
(Continued)

OTHER PUBLICATIONS

International Search Report dated Apr. 16, 2019, issued in Application No. PCT/CN2019/072313, with English translation (11 pages).
(Continued)

*Primary Examiner* — Ricky Q Ngo
*Assistant Examiner* — Stephen N Steiner
(74) *Attorney, Agent, or Firm* — HAUPTMAN HAM, LLP

(57) ABSTRACT

A coordinated transmission control method, apparatus, and system. A primary access point and a secondary access point determine whether to perform coordinated transmission through inter-cell configuration parameter sharing and based on a dual decision condition of an interference test. An anti-interference beamforming manner is determined based on a specific cell configuration parameter, and whether to perform coordinated transmission is determined with reference to the dual decision condition of the interference test, wherein the primary and secondary access points learn an interference status in advance to prevent unnecessary retransmission resulting from interference caused during
(Continued)

actual coordinated transmission, and to improve communication efficiency.

16 Claims, 17 Drawing Sheets

Related U.S. Application Data continuation of application No. PCT/CN2019/072313, filed on Jan. 18, 2019.

(51) Int. Cl.
| | |
|---|---|
| H04L 5/00 | (2006.01) |
| H04L 25/02 | (2006.01) |
| H04W 24/08 | (2009.01) |
| H04W 28/18 | (2009.01) |
| H04W 84/12 | (2009.01) |
| H04W 92/20 | (2009.01) |

(52) U.S. Cl.
CPC ......... *H04L 25/0202* (2013.01); *H04W 24/08* (2013.01); *H04W 28/18* (2013.01); *H04W 84/12* (2013.01); *H04W 92/20* (2013.01)

(56) References Cited

U.S. PATENT DOCUMENTS

| | | | |
|---|---|---|---|
| 9,480,069 B2 | 10/2016 | Sadek | |
| 10,305,550 B2 | 5/2019 | Wang et al. | |
| 2010/0085917 A1* | 4/2010 | Gorokhov | H04L 5/006 370/328 |
| 2012/0140660 A1 | 6/2012 | Kang et al. | |
| 2015/0230111 A1 | 8/2015 | Wang et al. | |
| 2015/0288427 A1* | 10/2015 | Wang | H04W 72/542 370/329 |
| 2016/0073411 A1 | 3/2016 | Liu et al. | |
| 2020/0059808 A1 | 2/2020 | Lim et al. | |
| 2020/0127712 A1* | 4/2020 | Forenza | H04B 7/024 |

FOREIGN PATENT DOCUMENTS

| | | |
|---|---|---|
| CN | 104956722 A | 9/2015 |
| CN | 105101417 A | 11/2015 |
| CN | 105554093 A | 5/2016 |
| CN | 106572489 A | 4/2017 |
| JP | 2010246113 A | 10/2010 |
| WO | 2012061325 A1 | 5/2012 |

OTHER PUBLICATIONS

IEEE 802.11-18/1982r0, Kiseon Ryu et al., "Consideration on multi-AP coordination for EHT", Nov. 2018 (11 pages).
Office Action dated Aug. 31, 2021, issued in counterpart JP Application No. 2020-539702, with English Translation. (4 pages).

* cited by examiner

| Category Category | Basic service set color or sending address (AP 1) | Uplink and downlink indication | Receiver address | Quantity of antennas (AP 1) | Quantity of spatial flows (Cell 1) | Bandwidth/ Resource block (STA 1) | ... | FCS frame detection sequence |
|---|---|---|---|---|---|---|---|---|

FIG. 3

| Legacy short training field L-STF | Legacy long training field L-LTF | Legacy signal field L-SIG | ... | NG signaling field NG-SIG-A/B | NG short training field NG-STF | NG long training field NG-LTF | Data Data |

FIG. 7a

| Legacy short training field L-STF | Legacy long training field L-LTF | Legacy signal field L-SIG | ... | NG signaling field NG-SIG-A/B | NG short training field NG-STF | NG long training field NG-LTF | Data Data | Interference test sequence |

FIG. 7b

| Legacy short training field L-STF | Legacy long training field L-LTF | Legacy signal field L-SIG | ... | NG signaling field NG-SIG-A/B | NG short training field NG-STF | NG long training field NG-LTF | Data Data | Filling | Interference test sequence |

FIG. 7c

COORDINATED TRANSMISSION CONTROL METHOD, APPARATUS, AND SYSTEM

CROSS-REFERENCE TO RELATED APPLICATIONS

This application is a continuation of U.S. patent application Ser. No. 16/931,551, filed on Jul. 17, 2020, which is a continuation of International Application No. PCT/CN2019/072313, filed on Jan. 18, 2019, which claims priority to Chinese Patent Application No. 201810054522.8, filed on Jan. 19, 2018. All of the afore-mentioned patent applications are hereby incorporated by reference in their entireties.

BACKGROUND

With the development of wireless networks and the unceasing popularization of a wireless local area network (Wireless Local Area Network, WLAN for short) technology, WLAN devices are increasingly concentrated. Because wireless access points (Access Point, AP for short) are easy to deploy, increasingly concentrated APs also cause more inter-cell interference. How to prevent inter-user or inter-cell interference through control of coordinated transmission between APs to improve quality of service for users is an issue that needs to be considered.

SUMMARY

Embodiments described herein provide a coordinated transmission control method, apparatus, and system, to implement coordinated transmission between a plurality of APs and prevent interference.

According to a first aspect, a coordinated transmission control method and apparatus are provided.

In at least one embodiment, the method is applied to a secondary access point AP, or is applied to a station STA corresponding to the secondary AP. The method includes: receiving, by the secondary access point AP, a coordinated transmission request sent by a primary AP, where the coordinated transmission request carries negotiation parameter information; and in response to the secondary AP, based on the negotiation parameter information, performing coordinated transmission with the primary AP, sending, by the secondary AP, interference test information to the primary AP, and receiving decision information that indicates whether to perform coordinated transmission and that is sent by the primary AP based on the interference test information. In at least one embodiment, the primary AP is to schedule a station STA in a cell to perform uplink transmission, and the secondary AP is to schedule a station STA in a cell to perform downlink transmission, but no limitation is set thereto.

In at least one embodiment, whether to perform coordinated transmission is determined through inter-cell configuration parameter sharing and based on a dual decision condition of an interference test, so that the access points learn an interference status in advance, thereby preventing unnecessary retransmission resulting from interference caused during actual coordinated transmission, and improving communication efficiency.

In at least one embodiment, in response to the secondary AP not, based on the negotiation parameter information, performing coordinated transmission with the primary AP, the secondary AP does not provide a feedback to the primary AP within a preset time, or sends first response information to the primary AP to indicate that the secondary AP cannot perform coordinated transmission.

In at least one embodiment, in response to the secondary AP performing coordinated transmission with the primary AP, the secondary AP sends second response information to the primary AP to indicate that the secondary AP expects to perform coordinated transmission. The second response information is sent together with or separately from the interference test information.

In at least one embodiment, the coordinated transmission request carries first indication information, and the first indication information is used to indicate whether the interference test information is sent together with the second response information.

In at least one embodiment, the decision information is carried in a coordination acknowledgment frame or is carried in an uplink transmission trigger frame sent to a to-be-scheduled station STA.

In at least one embodiment, the negotiation parameter information includes at least one of the following: a quantity of antennas of the primary AP and a quantity of spatial flows in a cell corresponding to the primary AP.

In at least one embodiment, the sending, by the secondary AP, interference test information to the primary AP includes: in response to the quantity of spatial flows being less than or equal to the quantity of antennas of the primary AP, and a quantity of antennas of the secondary AP is greater than the quantity of antennas of the primary AP, sending, by the secondary AP, the interference test information to the primary AP by using a first precoding matrix $Q_2$, where $Q_2$ is a precoding matrix that is used to prevent interference to data reception performed by the primary AP and that is determined by the secondary AP according to a preset first standard; or in response to the quantity of spatial flows being less than the quantity of antennas of the primary AP, and a quantity of antennas of the secondary AP is less than or equal to the quantity of antennas of the primary AP, sending, by the secondary AP, second indication information to the primary AP to indicate a receive equalization matrix $W_1$ used by the primary AP to receive data, and sending the interference test information by using a second precoding matrix $Q_2'$, where $Q_2'$ is a precoding matrix that is used to prevent interference to data reception performed by the primary AP, that is used by the secondary AP to send data, and that is determined by the secondary AP according to a preset second standard, and $W_1$ is a receive equalization matrix used by the primary AP to receive data. According to at least one embodiment, the secondary AP determines an anti-interference beamforming manner based on a specific cell configuration parameter, thereby effectively avoiding interference.

In at least one embodiment, the first standard is $H_{21}Q_2=0$, where $H_{21}$ is channel estimation information between the primary AP and the secondary AP; and the second standard is $W_1H_{21}Q_2'=0$, where $H_{21}$ is channel estimation information between the primary AP and the secondary AP.

Correspondingly, a coordinated transmission control apparatus is provided. The apparatus implements the corresponding method in the first aspect. For example, based on function forms, the apparatus is an access point AP or a station STA. For example, the apparatus is an access device or a station device, or is a chip or a function module in these devices. The foregoing method is implemented by software or hardware, or by hardware executing corresponding software.

In at least one embodiment, the apparatus includes a processor and a memory. The processor is configured to support the apparatus in performing a corresponding function in the method in the first aspect. The memory is configured to be coupled to the processor, and stores a program (instruction) and data that are necessary for the apparatus. In addition, the apparatus further includes a communications interface that is configured to support the apparatus in communicating with another network element. The communications interface is a transceiver.

In at least one embodiment, the apparatus includes a transceiver unit. The transceiver unit is configured to: receive a coordinated transmission request sent by a primary AP, send interference test information to the primary AP, and receive decision information that indicates whether to perform coordinated transmission and that is sent by the primary AP based on the interference test information. Optionally, the apparatus further includes a processing unit, and the processing unit is configured to determine, based on the negotiation parameter information, that the apparatus intends to perform coordinated transmission with the primary AP.

According to a second aspect, a coordinated transmission control method and apparatus are provided.

In at least one embodiment, the method is applied to a primary access point AP, or is applied to a station STA corresponding to the primary AP. The method includes: sending, by the primary access point AP, a coordinated transmission request to at least one secondary access point AP, where the coordinated transmission request carries negotiation parameter information; in response to the secondary AP, based on the negotiation parameter information performing coordinated transmission with the primary AP, receiving, by the primary AP, interference test information sent by the secondary AP; performing, by the primary AP, a reception interference test based on the interference test information, to determine whether interference is greater than or is greater than or equal to a predetermined threshold; and sending, by the primary AP based on a result of the determining, decision information to the secondary AP to indicate whether the secondary AP performs coordinated transmission. In at least one embodiment, the primary AP is to schedule a station STA in a cell to perform uplink transmission, and the secondary AP is to schedule a station STA in a cell to perform downlink transmission, but no limitation is set thereto.

In at least one embodiment, whether to perform coordinated transmission is determined through inter-cell configuration parameter sharing and based on a dual decision condition of an interference test, so that the access points learn an interference status in advance, thereby preventing unnecessary retransmission resulting from interference caused during actual coordinated transmission, and improving communication efficiency.

In at least one embodiment, in response to the secondary AP determining, based on the negotiation parameter information, to skip performing coordinated transmission with the primary AP, the primary AP receives no feedback from the secondary AP within a preset time, or receives first response information sent by the secondary AP, where the first response information is used to indicate that the secondary AP cannot perform coordinated transmission.

In at least one embodiment, in response to the secondary AP performing coordinated transmission with the primary AP, the primary AP receives second response information sent by the secondary AP, where the second response information is used to indicate that the secondary AP expects to perform coordinated transmission. Optionally, the second response information is sent together with or separately from the interference test information.

In at least one embodiment, the coordinated transmission request carries first indication information, and the first indication information is used to indicate whether the interference test information is sent together with the second response information.

In at least one embodiment, the decision information is carried in a coordination acknowledgment frame or is carried in an uplink transmission trigger frame sent to a to-be-scheduled station STA.

In at least one embodiment, the negotiation parameter information includes at least one of the following: a quantity of antennas of the primary AP and a quantity of spatial flows in a cell corresponding to the primary AP.

In at least one embodiment, the receiving, by the primary AP, interference test information sent by the secondary AP includes: in response to the quantity of spatial flows being less than or equal to the quantity of antennas of the primary AP, and a quantity of antennas of the secondary AP is greater than the quantity of antennas of the primary AP, receiving, by the primary AP, the interference test information sent by the secondary AP by using a first precoding matrix $Q_2$, where $Q_2$ is a precoding matrix that is used to prevent interference to data reception performed by the primary AP and that is determined by the secondary AP according to a preset first standard; or in response to the quantity of spatial flows being less than the quantity of antennas of the primary AP, and a quantity of antennas of the secondary AP is less than or equal to the quantity of antennas of the primary AP, further receiving, by the primary AP, second indication information sent by the secondary AP, where the second indication information is used to indicate a receive equalization matrix $W_1$ used by the primary AP to receive data; and receiving the interference test information sent by the secondary AP by using a second precoding matrix $Q_2'$, where $Q_2'$ is a precoding matrix that is used to prevent interference to data reception performed by the primary AP, that is used by the secondary AP to send data, and that is determined by the secondary AP according to a preset second standard, and $W_1$ is a receive equalization matrix used by the primary AP to receive data. According to at least one embodiment, the secondary AP determines an anti-interference beamforming manner based on a specific cell configuration parameter, thereby effectively avoiding interference.

In at least one embodiment, the first standard is $H_{21}Q_2=0$, where $H_{21}$ is channel estimation information between the primary AP and the secondary AP; and the second standard is $W_1H_{21}Q_2'=0$, where $H_{21}$ is channel estimation information between the primary AP and the secondary AP.

Correspondingly, a coordinated transmission control apparatus is provided. The apparatus implements the corresponding method in the second aspect. For example, based on function forms, the apparatus is an access point AP or a station STA. For example, the apparatus is an access device or a station device, or is a chip or a function module in these devices. The foregoing method is implemented by software or hardware, or by hardware executing corresponding software.

In at least one embodiment, the apparatus includes a processor and a memory. The processor is configured to support the apparatus in performing a corresponding function in the method in the second aspect. The memory is configured to be coupled to the processor, and stores a program (instruction) and data that are necessary for the apparatus. In addition, the apparatus further includes a communications interface that is configured to support the apparatus in communicating with another network element. The communications interface is a transceiver.

In at least one embodiment, the apparatus includes a transceiver unit. The transceiver unit is configured to: send a coordinated transmission request to at least one secondary AP, receive interference test information sent by the secondary AP, and send decision information to the secondary AP to indicate whether the secondary AP performs coordinated transmission. Optionally, the apparatus further includes a processing unit, and the processing unit is configured to perform a reception interference test based on the interference test information, to determine whether interference is greater than or is greater than or equal to a predetermined threshold.

According to a third aspect, a coordinated transmission control method and apparatus are provided.

In at least one embodiment, the method is applied to a secondary access point AP, or is applied to a station STA corresponding to the secondary AP.

The method includes: receiving, by the secondary access point AP, a coordinated transmission request sent by a primary AP, where the coordinated transmission request carries negotiation parameter information; in response to the secondary AP, based on the negotiation parameter information, performing coordinated transmission with the primary AP, sending, by the secondary AP, first response information to the primary AP to indicate that the secondary AP expects to perform coordinated transmission; receiving, by the secondary AP, interference test information sent by the primary AP; and determining, by the secondary AP based on an interference test result of the interference test information, whether to perform coordinated transmission. In at least one embodiment, the primary AP is to schedule a station STA in a cell to perform downlink transmission, and the secondary AP is to schedule a station STA in a cell to perform uplink transmission, but no limitation is set thereto.

In at least one embodiment, whether to perform coordinated transmission is determined through inter-cell configuration parameter sharing and based on a dual decision condition of an interference test, so that the access points learn an interference status in advance, thereby preventing unnecessary retransmission resulting from interference caused during actual coordinated transmission, and improving communication efficiency.

In at least one embodiment, in response to the secondary AP determining, based on the negotiation parameter information, to skip performing coordinated transmission with the primary AP, the secondary AP does not provide a feedback to the primary AP within a preset time, or sends second response information to the primary AP to indicate that the secondary AP cannot perform coordinated transmission.

In at least one embodiment, the determining, by the secondary AP based on an interference test result of the interference test information, whether to perform coordinated transmission includes: in response to interference being less than or equal to a predetermined threshold, sending, by the secondary AP, a trigger frame to a to-be-scheduled second station STA, and scheduling the second STA to perform uplink data transmission, or in response to interference being greater than the predetermined threshold, skipping sending, by the secondary AP, the trigger frame; or in response to interference being less than a predetermined threshold, sending, by the secondary AP, a trigger frame to a to-be-scheduled second STA, and scheduling the second STA to perform uplink data transmission, or in response to interference being greater than or equal to the predetermined threshold, skipping sending, by the secondary AP, the trigger frame.

In at least one embodiment, the interference test information includes information about a corresponding training field in a downlink data packet sent by the primary AP to a to-be-scheduled first STA; or the interference test information is information about a corresponding field in a separate data packet sent by the primary AP before the primary AP sends a downlink data packet to the first STA.

In at least one embodiment, in response to the interference test information including the information about the corresponding training field in the downlink data packet sent by the primary AP to the first STA, transmission of the trigger frame starts in a transmission process of the downlink data packet, and uplink data transmission of the to-be-scheduled second STA ends before transmission of a data field in the downlink data packet ends, or ends at the same time as transmission of a data field in the downlink data packet; or in response to the interference test information including the information about the corresponding field in the separate data packet sent by the primary AP to the first STA, transmission of the trigger frame starts before transmission of a data field in the downlink data packet sent by the primary AP to the first STA ends, and uplink data transmission of the to-be-scheduled second STA ends before transmission of the data field in the downlink data packet ends, or ends at the same time as transmission of the data field in the downlink data packet.

In at least one embodiment, the negotiation parameter information includes at least one of the following: a quantity of antennas of the primary AP and a quantity of spatial flows in a cell corresponding to the primary AP.

In at least one embodiment, the receiving, by the secondary AP, interference test information sent by the primary AP includes: receiving, by the secondary AP by using a selected receive equalization matrix used to prevent the primary AP from causing interference to data reception performed by the secondary AP, the interference test information sent by the primary AP, where in response to the quantity of spatial flows being less than or equal to the quantity of antennas of the primary AP, and a quantity of antennas of the secondary AP is greater than the quantity of antennas of the primary AP, the secondary AP selects a first receive equalization matrix $W_2$ according to a first standard; or in response to the quantity of spatial flows being less than the quantity of antennas of the primary AP, and a quantity of antennas of the secondary AP is less than or equal to the quantity of antennas of the primary AP, the secondary AP selects, according to a second standard, a second receive equalization matrix $W_2'$ and a precoding matrix $Q_1$ that is used by the primary AP to send data. Before the receiving, by the secondary AP, interference test information sent by the primary AP, the method further includes: sending, by the secondary AP, first indication information to the primary AP to indicate the precoding matrix $Q_1$ used by the primary AP to send data. According to at least one embodiment, the secondary AP determines an anti-interference beamforming manner based on a specific cell configuration parameter, thereby effectively avoiding interference.

In at least one embodiment, the first standard is $W_2H_{21}=0$, where $H_{21}$ is channel estimation information between the primary AP and the secondary AP; and the second standard is $W_2'H_{21}Q_1=0$, where $H_{21}$ is channel estimation information between the primary AP and the secondary AP.

Correspondingly, a coordinated transmission control apparatus is provided. The apparatus implements the corresponding method in the third aspect. For example, based on function forms, the apparatus is an access point AP or a station STA. For example, the apparatus is an access device or a station device, or is a chip or a function module in these devices. The foregoing method is implemented by software or hardware, or by hardware executing corresponding software.

In at least one embodiment, the apparatus includes a processor and a memory. The processor is configured to support the apparatus in performing a corresponding function in the method in the third aspect. The memory is configured to be coupled to the processor, and stores a program (instruction) and data that are necessary for the apparatus. In addition, the apparatus further includes a communications interface that is configured to support the apparatus in communicating with another network element. The communications interface is a transceiver.

In at least one embodiment, the apparatus includes a transceiver unit. The transceiver unit is configured to: receive a coordinated transmission request sent by a primary AP, send first response information to the primary AP, and receive interference test information sent by the primary AP. Optionally, the apparatus further includes a processing unit, and the processing unit is configured to determine, based on an interference test result of the interference test information, whether to perform coordinated transmission.

According to a fourth aspect, a coordinated transmission control method and apparatus are provided.

In at least one embodiment, the method is applied to a primary access point AP, or is applied to a station STA corresponding to the primary AP. The method includes: sending, by the primary access point AP, a coordinated transmission request to a secondary AP, where the coordinated transmission request carries negotiation parameter information; in response to the secondary AP, based on the negotiation parameter information, performing coordinated transmission with the primary AP, receiving, by the primary AP, first response information sent by the secondary AP, where the first response information is used to indicate that the secondary AP expects to perform coordinated transmission; and sending, by the primary AP, interference test information to the secondary AP, where the interference test information is used by the secondary AP to perform an interference test to determine whether to perform coordinated transmission. In at least one embodiment, the primary AP is to schedule a station STA in a cell to perform downlink transmission, and the secondary AP is to schedule a station STA in a cell to perform uplink transmission, but no limitation is set thereto.

In at least one embodiment, whether to perform coordinated transmission is determined through inter-cell configuration parameter sharing and based on a dual decision condition of an interference test, so that the access points learn an interference status in advance, thereby preventing unnecessary retransmission resulting from interference caused during actual coordinated transmission, and improving communication efficiency.

In at least one embodiment, in response to the secondary AP determining, based on the negotiation parameter information, to skip performing coordinated transmission with the primary AP, the primary AP receives no feedback from the secondary AP within a preset time, or receives second response information sent by the secondary AP, where the second response information is used to indicate that the secondary AP cannot perform coordinated transmission.

In at least one embodiment, the method further includes: receiving, by the primary AP, first indication information sent by the secondary AP, where the first indication information is used to indicate a precoding matrix $Q_1$ used by the primary AP to send data, and the interference test information is sent by using $Q_1$. According to at least one embodiment, the secondary AP determines an anti-interference beamforming manner based on a specific cell configuration parameter, thereby effectively avoiding interference.

In at least one embodiment, the interference test information includes information about a corresponding training field in a downlink data packet sent by the primary AP to a to-be-scheduled station STA; or the interference test information is information about a corresponding field in a separate data packet sent by the primary AP before the primary AP sends a downlink data packet to the to-be-scheduled station STA.

In at least one embodiment, the negotiation parameter information includes at least one of the following: a quantity of antennas of the primary AP and a quantity of spatial flows in a cell corresponding to the primary AP.

Correspondingly, a coordinated transmission control apparatus is provided. The apparatus implements the corresponding method in the fourth aspect. For example, based on function forms, the apparatus is an access point AP or a station STA. For example, the apparatus is an access device or a station device, or is a chip or a function module in these devices. The foregoing method is implemented by software or hardware, or by hardware executing corresponding software.

In at least one embodiment, the apparatus includes a processor and a memory. The processor is configured to support the apparatus in performing a corresponding function in the method in the fourth aspect. The memory is configured to be coupled to the processor, and stores a program (instruction) and data that are necessary for the apparatus. In addition, the apparatus further includes a communications interface that is configured to support the apparatus in communicating with another network element. The communications interface is a transceiver.

In at least one embodiment, the apparatus includes a transceiver unit. The transceiver unit is configured to: send a coordinated transmission request to a secondary AP, receive first response information sent by the secondary AP, and send interference test information to the secondary AP. Optionally, the apparatus further includes a processing unit, and the processing unit is configured to determine to-be-sent information or process received information.

At least one embodiment further provides a computer storage medium, where the computer storage medium stores a computer program (instruction). In response to the program (instruction) being run on a computer, the computer is enabled to perform the method in any one of the foregoing aspects.

At least one embodiment further provides a computer program product. In response to the computer program product being run on a computer, the computer is enabled to perform the method according to any one of the foregoing aspects.

At least one embodiment further provides a chip configured for coordinated transmission control, where the chip stores an instruction. In response to the instruction being run on a communications device, the communications device is enabled to perform the corresponding methods in the foregoing aspects.

At least one embodiment further provides a coordinated transmission control apparatus, including a memory, a processor, and a computer program that is stored in the memory and that is run on the processor. In response to executing the computer program, the processor implements the corresponding methods in the foregoing aspects.

At least one embodiment further provides a coordinated transmission control apparatus, including a processor. The processor is configured to be coupled to a memory, read an instruction in the memory, and implement the corresponding methods in the foregoing aspects according to the instruction. The memory is integrated into the processor, or exists independent of the processor.

At least one embodiment further provides a coordinated transmission control apparatus, including a processor. In response to executing a computer program, the processor implements the corresponding methods in the foregoing aspects.

At least one embodiment further provides a coordinated transmission control system, including the primary AP apparatus provided above and at least one secondary AP apparatus provided above. These components in the system implement the corresponding methods in the foregoing aspects.

Any apparatus, the computer storage medium, the computer program product, the chip, and the system that are provided above are all configured to implement the corresponding methods provided above. Therefore, for beneficial effects that is achieved by the apparatus, the computer storage medium, the computer program product, the chip, and the system, refer to beneficial effects of the corresponding methods, and details are not described herein again.

BRIEF DESCRIPTION OF DRAWINGS

To describe the technical solutions in the embodiments of embodiments described herein more clearly, the following briefly describes the accompanying drawings for describing the embodiments. Apparently, the accompanying drawings in the following description show merely some embodiments, and a person of ordinary skill in the art is able to derive other drawings from the embodiments and these accompanying drawings without creative efforts.

FIG. 3 is a schematic diagram of an information format of a coordinated (parallel) transmission request according to at least one embodiment;

FIG. 7a is a schematic diagram of an information format of a coordinated (parallel) transmission response according to at least one embodiment;

FIG. 7b is a schematic diagram of another information format of a coordinated (parallel) transmission response according to at least one embodiment;

FIG. 7c is a schematic diagram of another information format of a coordinated (parallel) transmission response according to at least one embodiment;

DESCRIPTION OF EMBODIMENTS

Figure 1:
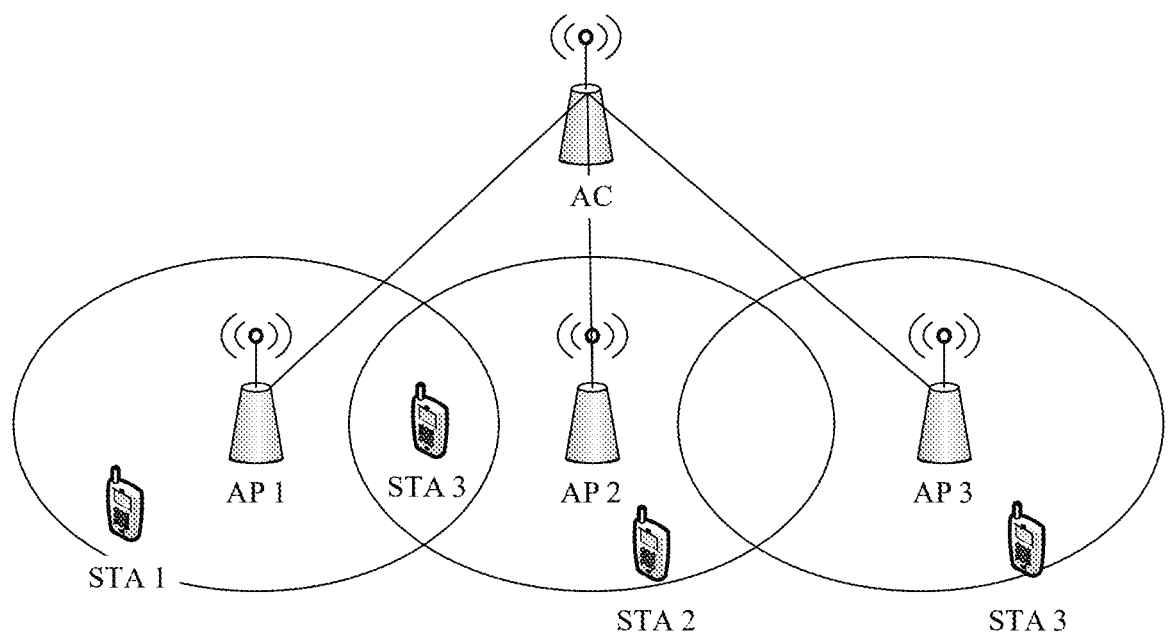
FIG. 1 shows an architecture of a network system according to at least one embodiment.

To make technical problems to be resolved by embodiment described herein, and the technical solutions used and technical effects achieved in embodiments described herein clearer, the following further describes in detail the technical solutions in embodiment described herein with reference to embodiments and accompanying drawings. The detailed descriptions provide various embodiments of a device and/or a process by using block diagrams, flowcharts, and/or examples. These block diagrams, flowcharts, and/or examples include one or more functions and/or operations, so persons in the art understand that each function and/or operation in the block diagrams, the flowcharts, and/or the examples is performed independently and/or jointly by using much hardware, software, and firmware, and/or any combination thereof.

"A plurality of" in at least one embodiment refers to two or more than two. The term "and/or" in at least one embodiment describes only an association relationship for describing associated objects and represents that three relationships exists. For example, A and/or B represent the following three cases: Only A exists, both A and B exist, and only B exists. In addition, the character "/" in this specification generally indicates an "or" relationship between the associated objects. In at least one embodiment, the terms "first", "second", and so on are intended to distinguish between different objects but do not indicate a particular order of the objects.

In at least one embodiment, nouns "network" and "system" are usually interchangeably used, but a person skilled in the art understands meanings of the nouns. In some cases, "stations (Station, STA for short)"/"terminals" mentioned in at least one embodiment each is a mobile device, for example, a mobile phone, a personal digital assistant, a handheld or laptop computer, and a similar device having a telecommunication capability. In some cases, the "station"/"terminal" is a wearable device or the like, or is any hardware or software component that terminates a communication session of a user. In addition, "user terminal", "User Equipment", "UE", "terminal device", "user device", "user agent", "User Agent", "UA", "user equipment", "mobile device", "device", and the like are all alternative terms with same meanings as "station (Station, STA for short)"/"terminal" in this specification. For ease of description, the devices mentioned above are collectively referred to as sites or STAs in at least one embodiment.

An "access point (Access Point, AP for short)" mentioned in at least one embodiment is a network device, that is, an apparatus deployed in a radio access network to provide a wireless communication function for a terminal device, and is responsible for scheduling and configuring uplink/downlink transmission of a STA. The access point includes various forms of macro base stations, micro base stations, relay nodes, access points, and the like, and includes a system and a device as improvements of peer devices in a conventional wireless telecommunications system. Such an advanced device or a next-generation device is included in a long term evolution LTE communications system, a 5G communications system, a future evolved system, or a plurality of types of communications convergence systems. A name of a device having an access point function varies with systems using different radio access technologies. For ease of description, in at least one embodiment, all the foregoing apparatuses that provide a wireless communications function for the STA are referred to as access points or APs.

The "coordinated transmission" mentioned in at least one embodiment means: At least two APs/STAs each perform intra-cell communication transmission, and to avoid mutual interference between two cells, the APs/STAs perform coordinated transmission. Such coordinated transmission is also be referred to as parallel transmission because the at least two APs/STAs simultaneously perform transmission.

FIG. 1 provides an architecture of a network system in at least one embodiment. In the system, there are two or more APs, and for each AP, there is one or more STAs associated with the AP. In addition, there are one primary AP (for example, an AP 1) and at least one secondary AP (for example, an AP 2 and an AP 3) among a plurality of APs. The AP 1 is an access point that obtains, through contention, a right to use a channel, or a primary AP that is elected by an AC from an AP group as an access point that is in the AP group and whose transmission is preferentially ensured during joint transmission. The AP 1 serving as the primary AP is an access point whose transmission is preferentially ensured. Optionally, the AP 1 is elected from an AP group as a control point of the AP group according to a defined rule or become a control point of the AP group through contention. The AP 1 performs functions of controlling and managing transmission, a resource, and the like on the AP group, and coordinates coordinated transmission of a plurality of APs. Optionally, the functions of controlling and managing the AP group is implemented by using an additional access controller (Access Controller, AC for short). An additional AC is further disposed in the AP group to coordinate coordinated transmission of a plurality of APs. Wired transmission or wireless transmission is used between APs and between an AP and an AC.

In the system, in response to the AP 1 scheduling a STA 1 in a cell served by the AP 1 to perform uplink transmission, and the AP 2 schedules a STA 2 in a cell served by the AP 2 to perform downlink transmission, because a distance is relatively short, the downlink transmission of the AP 2 causes strong interference to the AP 1 that performs uplink reception. Alternatively, in response to the AP 1 scheduling a STA 1 in a cell served by the AP 1 to perform downlink transmission, and the AP 2 schedules a STA 2 in a cell served by the AP 2 to perform uplink transmission, because a distance is relatively short, the downlink transmission of the AP 1 causes strong interference to the AP 2 that performs uplink reception. To avoid interference, the cell served by the AP 1 and the cell served by the AP 2 are unable to perform coordinated transmission, leading to low communication efficiency. Therefore, in at least one embodiment, coordinated transmission control is performed between a primary AP and a secondary AP, to improve communication efficiency while implementing interference control.

Embodiment 1

Figure 2:
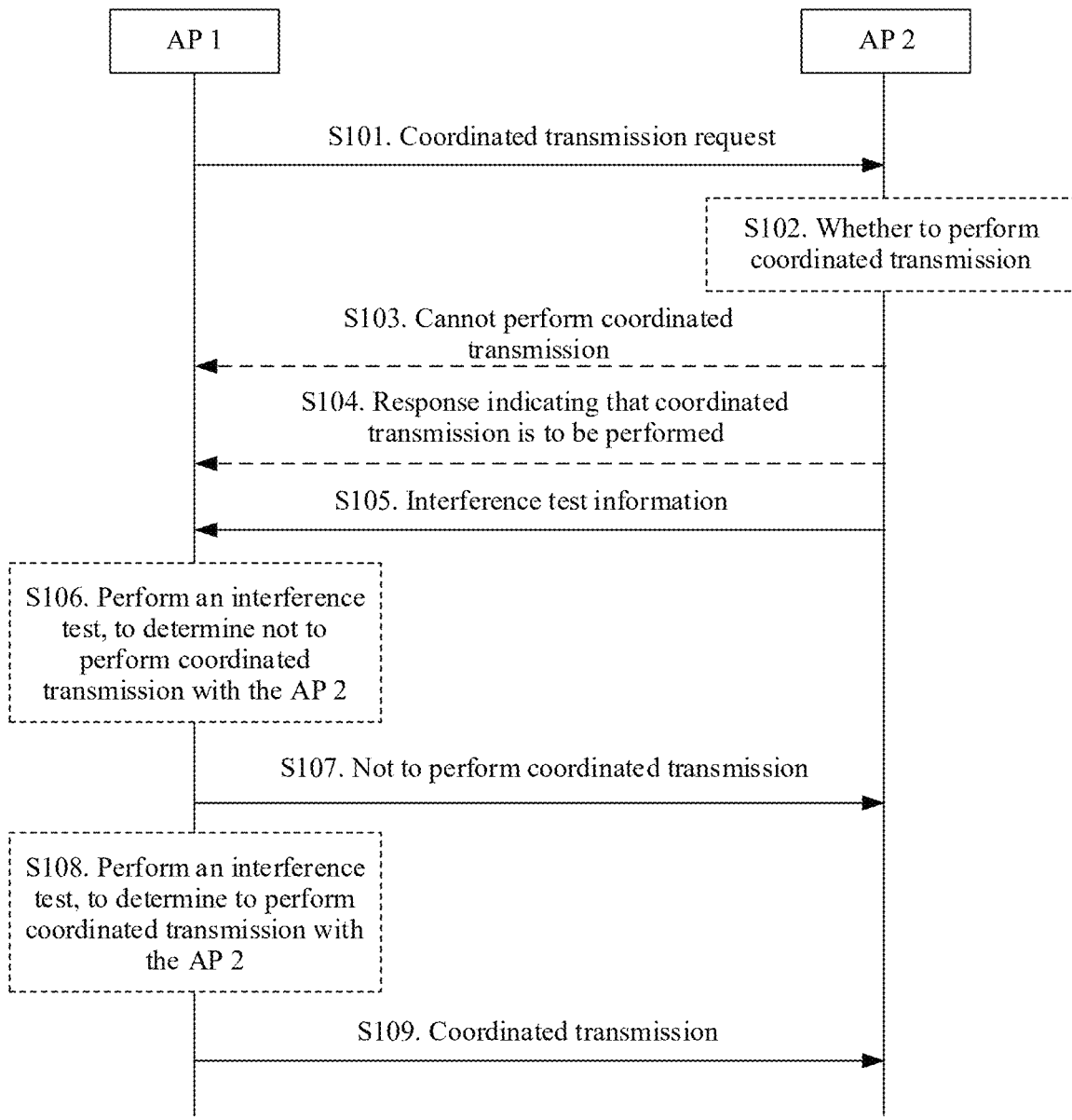
FIG. 2 is a flowchart of a first embodiment of a coordinated transmission control method according to at least one embodiment.

In a system, in response to coordinated transmission being performed between a primary access point (an AP 1) and at least one secondary access point (an AP 2, an AP 3, and the like), a method in this embodiment needs to be used to perform coordinated transmission control to prevent inter-cell interference. According to at least one embodiment, FIG. 2 is a flowchart of a first embodiment of a coordinated transmission control method according to at least one embodiment. This embodiment is described by using a scenario in which an AP 1 is to perform uplink transmission and an AP 2 is to perform downlink transmission as an example, but no limitation is set thereto. A station correspondingly scheduled by the AP 1 is a STA 1, and a station correspondingly scheduled by the AP 2 is a STA 2. To facilitate understanding of the solution, overall descriptions of this embodiment and subsequent embodiments are provided from a perspective of a plurality of interacting parties by using an example in which the AP 2 is used as a secondary access point. However, this certainly does not mean that an improvement to the system uses steps on all interacting sides be performed together. In the technical solution proposed in at least one embodiment, an improvement is made on each side of the system.

The method includes the following steps.

S101. A secondary access point AP receives a coordinated transmission request sent by the AP 1, where the coordinated transmission request carries negotiation parameter information.

After an AP obtains a right to use a channel or is elected from the system, the AP is determined as a primary AP (that is, the AP 1), and other APs in the system are secondary APs (for example, the AP 2 and an AP 3). In this case, data transmission of the AP 1 and scheduling of the station STA 1 corresponding to the AP 1 need to be ensured in the system. The AP 1 determines to schedule the STA 1 to perform uplink transmission, and sends the coordinated transmission request to the secondary AP (for example, the AP 2). Optionally, an action (Action) frame is used as an information format of the coordinated transmission request. For a specific structure of the frame, refer to FIG. 3. FIG. 3 is a schematic diagram of an information format of a coordinated (parallel) transmission request. The coordinated transmission request carries negotiation parameter information, optionally including at least one of the following: a quantity of antennas of the AP 1, a quantity of spatial flows in a cell 1 served by the AP 1, a basic service set color (Basic Service Set Color, BSS Color for short) used to identify a cell served by the AP 1, a transmitter address (that is, an address of the AP 1), an uplink/downlink indication used to indicate whether the AP 1 is to perform uplink transmission or to perform downlink transmission (the AP 1 is to perform uplink transmission in this embodiment), a receiver address (that is, an address of the AP 2), and a bandwidth/resource block used by the to-be-scheduled STA 1 to send data. The foregoing parameter information does not constitute any limitation on this application. For example, the parameter information further includes transmit power and modulation and coding information.

S102. The AP 2 determines, based on the negotiation parameter information, whether to perform coordinated transmission with the AP 1.

The AP 2 determines, based on the negotiation parameter information, whether to perform coordinated transmission with the AP 1. For example, the AP 2 determines, based on the quantity of spatial flows and information about the quantity of antennas of the AP 1 in combination with a quantity of antennas of the AP 2, whether the AP 2 performs coordinated transmission with the AP 1. For example, in response to the quantity of spatial flows being equal to the quantity of antennas of the AP 1, and the quantity of antennas of the AP 2 is less than or equal to the quantity of antennas of the AP 1, the AP 2 cannot prevent, by using a reserved spatial direction, interference to uplink data reception performed by the AP 1, and therefore cannot perform coordinated transmission; and in response to the quantity of spatial flows being less than or equal to the quantity of antennas of the AP 1, and the quantity of antennas of the AP 2 is greater than the quantity of antennas of the AP 1, or in response to the quantity of spatial flows being less than the quantity of antennas of the AP 1, and the quantity of antennas of the AP 2 is less than or equal to the quantity of antennas of the AP 1, the AP 2 prevents, by using a reserved spatial direction, interference to uplink data reception performed by the AP 1, and therefore performs coordinated transmission. The foregoing is merely an example of at least one embodiment. A manner in which the AP 2 determines whether to coordinate with the AP 1 is not limited thereto.

S103. In response to determining not to perform coordinated transmission with the AP 1, the AP 2 feeds back, to the AP 1, information indicating that the AP 2 cannot perform coordinated transmission.

This step is an optional step. In response to determining not to perform coordinated transmission with the AP 1, the AP 2 feeds back, by using this step, the information indicating that the AP 2 cannot perform coordinated transmission, to notify the AP 1. Optionally, in response to determining not to perform coordinated transmission with the AP 1, the AP 2 does not reply to the coordinated transmission request within a preset time, so that the AP 1 determines that the AP 2 cannot perform coordinated transmission. In this case, an operation of this step is not used.

In response to the AP 2 not performing coordinated transmission, the AP 1 continues to select a secondary AP (for example, the AP 3) in another cell to perform coordinated transmission, or perform single-cell transmission.

S104. In response to determining to perform coordinated transmission with the AP 1, the AP 2 sends, to the AP 1, response information indicating that the AP 2 determines to perform coordinated transmission.

This step is an optional step, and interference test information sent in step S105 alternatively indicates that the AP 2 determines to perform coordinated transmission. An information format of the response information is an existing information format. FIG. 7a is a schematic diagram of an information format of a coordinated (coordinated) transmission response. The coordinated transmission response first includes a legacy short training field (Legacy Short Training Field, L-STF for short), a legacy long training field (Legacy Long Training Field, L-LTF for short), and a legacy signal field (Legacy Signal Field, L-SIG for short) that are used to ensure backward compatibility and indicate duration corresponding to data. A preamble further includes next generation signaling A and/or B (Next Generation Signaling A/B, NG-SIG-A/B for short) used to carry signaling information specific to the NG standard. NG indicates a code name, and stands for Next Generation (next generation). Certainly, another code name is also used. Follow-up fields include a next generation short training field (Next Generation Short Training Field, NG-STF for short) and a next generation long training field (Next Generation Long Training Field, NG-LTF for short) that are respectively used for automatic gain control (Automatic Gain Control, AGC for short) and channel measurement in a case of multiple input multiple output (Multiple Input Multiple Output, MIMO for short). The NG-LTF field includes a plurality of NG-LTF symbols, and is used for channel measurement in a plurality of space-time flows. A follow-up part is a data (Data) field used to carry a MAC frame, and the data field indicates that the AP 2 expects to perform coordinated transmission.

S105. In response to determining to perform coordinated transmission with the AP 1, the AP 2 sends the interference test information to the AP 1.

Figure 7D:
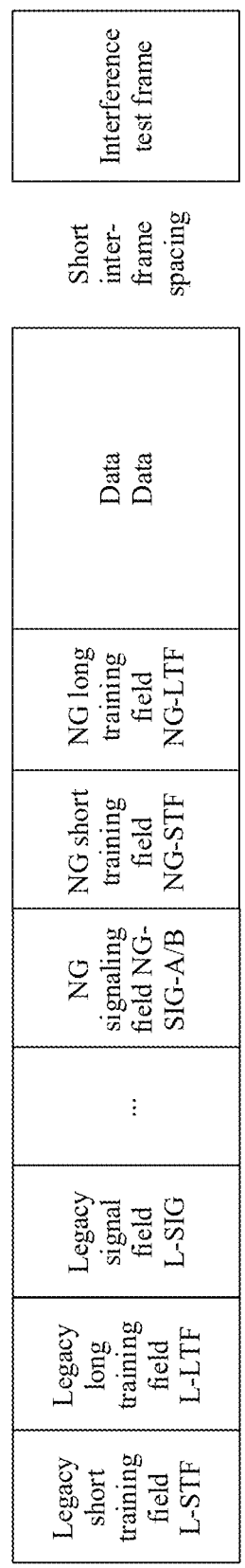
FIG. 7d is a schematic diagram of a transmission mode for coordinated (parallel) transmission response information and interference test information according to at least one embodiment.

In response to step S104 being performed, the interference test information is sent together with or separately from the response information indicating that the AP 2 determines to perform coordinated transmission. A frame structure used in response to the interference test information being sent together with the response information is a data packet structure shown in FIG. 7b; or a frame structure used in response to the interference test information being sent together with the response information is a data packet structure shown in FIG. 7c, where a padding field is further provided between the interference test information and a data field. A frame structure used in response to the interference test information being sent separately from the response information is shown in FIG. 7d, where the interference test information and a response information frame are separated by a short inter-frame spacing. In both cases, whether the interference test information exists after the data field is indicated by using a bit indication of a signal field of the response information.

In step S101, the coordinated transmission request sent by the AP 1 also indicates whether a data packet of the response information sent by the AP 2 is expected to carry the interference test information.

The interference test information is an interference test sequence, and some existing sequences in the 802.11 standard is used, for example, a legacy long training sequence (Legacy Long Training Field, L-LTF for short). The interference test sequence is a high throughput long training sequence (High Throughput LTF, HT-LTF for short), a very high-rate long training sequence (Very HT LTF, VHT-LTF for short), a high efficient long training sequence (High Efficient LTF, HE-LTF for short), or is a random sequence.

The interference test information is sent by using a precoding matrix $Q_2$ used to prevent interference to data reception performed by the AP 1. Optionally, a selection criterion of $Q_2$ is $H_{21}Q_2=0$. $H_{21}$ is channel estimation information between the AP 1 and the AP 2, and at least one embodiment is not limited thereto. Alternatively, considering a receive-end status in a cell served by the AP 2, the interference test information is sent by using another precoding matrix.

S106. The AP 1 performs an interference test based on the received interference test information, to determine not to perform coordinated transmission with the AP 2.

In response to step 104 being performed, the AP 1 determines, based on a data field of the response information, whether the AP 2 is to perform coordinated transmission. Optionally, the AP 1 determines, based on a corresponding bit indication, whether the interference test information exists after the data field.

The AP 1 tests, by using the interference test information, whether interference to the AP 2 exceeds a predetermined threshold; and in response to the interference exceeding the threshold, chooses not to perform coordinated transmission with the AP 2. Optionally, in response to the interference being equal to the threshold, the AP 1 chooses not to perform coordinated transmission with the AP 2.

S107. In response to choosing not to perform coordinated transmission with the AP 2, the AP 1 sends information indicating that the AP 1 is not to perform coordinated transmission with the AP 2.

The information is carried in a separate coordination acknowledgment frame and sent to the AP 2, or is carried in an uplink transmission trigger frame omnidirectionally sent to the STA 1. The information is a corresponding bit indication in the frame, for example, a 1-bit indication, and a value of the bit indication is 0 or 1. The information alternatively is a corresponding identifier, for example, a reserved identifier or an identifier of an AP that exists in a non-surrounding cell, indicating that the AP 1 does not expect to perform coordinated transmission.

S108. The AP 1 performs an interference test based on the received interference test information, to determine to perform coordinated transmission with the AP 2.

in response to step 104 being performed, the AP 1 determines, based on the data field of the response information, whether the AP 2 is to perform coordinated transmission. Optionally, the AP 1 determines, based on a corresponding bit indication, whether the interference test information exists after the data field.

The AP 1 tests, by using the interference test information, whether interference to the AP 2 exceeds the predetermined threshold; and in response to the interference not exceeding the threshold, chooses to perform coordinated transmission with the AP 2. Optionally, in response to the interference being equal to the predetermined threshold, the AP 1 chooses to perform coordinated transmission with the AP 2.

S109. In response to choosing to perform coordinated transmission with the AP 2, the AP 1 sends information indicating that the AP 1 is to perform coordinated transmission with the AP 2.

The information is carried in a separate coordination acknowledgment frame and sent to the AP 2, or is carried in an omnidirectionally sent uplink transmission trigger frame specific to the STA 1. The information is a corresponding bit indication in the frame, for example, a 1-bit indication, and a value of the bit indication is 0 or 1. The information alternatively is a corresponding identifier, for example, an identifier of the AP 2, indicating that the AP 1 expects to perform coordinated transmission.

In response to the AP 1 providing a feedback by using a separate coordination acknowledgment frame, regardless of whether coordinated transmission is selected, the AP 1 subsequently sends an uplink data transmission trigger frame to the STA 1 to be scheduled by the AP 1, and the STA 1 performs uplink data transmission after receiving the trigger frame. In response to the AP 1 providing a feedback by using the trigger frame, regardless of whether coordinated transmission is selected, the STA 1 performs uplink data transmission after receiving the trigger frame.

In response to the AP 1 choosing to perform coordinated transmission, the AP 2 sends downlink data to the to-be-scheduled STA 2 (in response to the interference test information being sent by using a specific precoding matrix such as $Q_2$ in S105, the downlink data is also sent by using $Q_2$) after receiving the coordination acknowledgment frame or the trigger frame, to perform coordinated transmission with the AP 1. Transmission of the AP 2 and the AP 1 ends at the same time, or downlink transmission of the AP 2 ends earlier than uplink transmission of the AP 1. Time information of the uplink transmission of the AP 1 is carried in any one of the foregoing messages or frames.

S103, S104, and S105 are not necessarily performed in a particular order, and are merely different processing in different cases. S106 and S107, and S108 and S109 are not necessarily performed in a particular order, and are merely different processing in different cases.

According to the coordinated transmission control method in at least one embodiment, whether to perform coordinated transmission is determined through inter-cell configuration parameter sharing and based on a dual decision condition of an interference test, so that the access points learn an interference status in advance, thereby preventing unnecessary retransmission resulting from interference caused during actual coordinated transmission, and improving communication efficiency.

Embodiment 2

Figure 4:
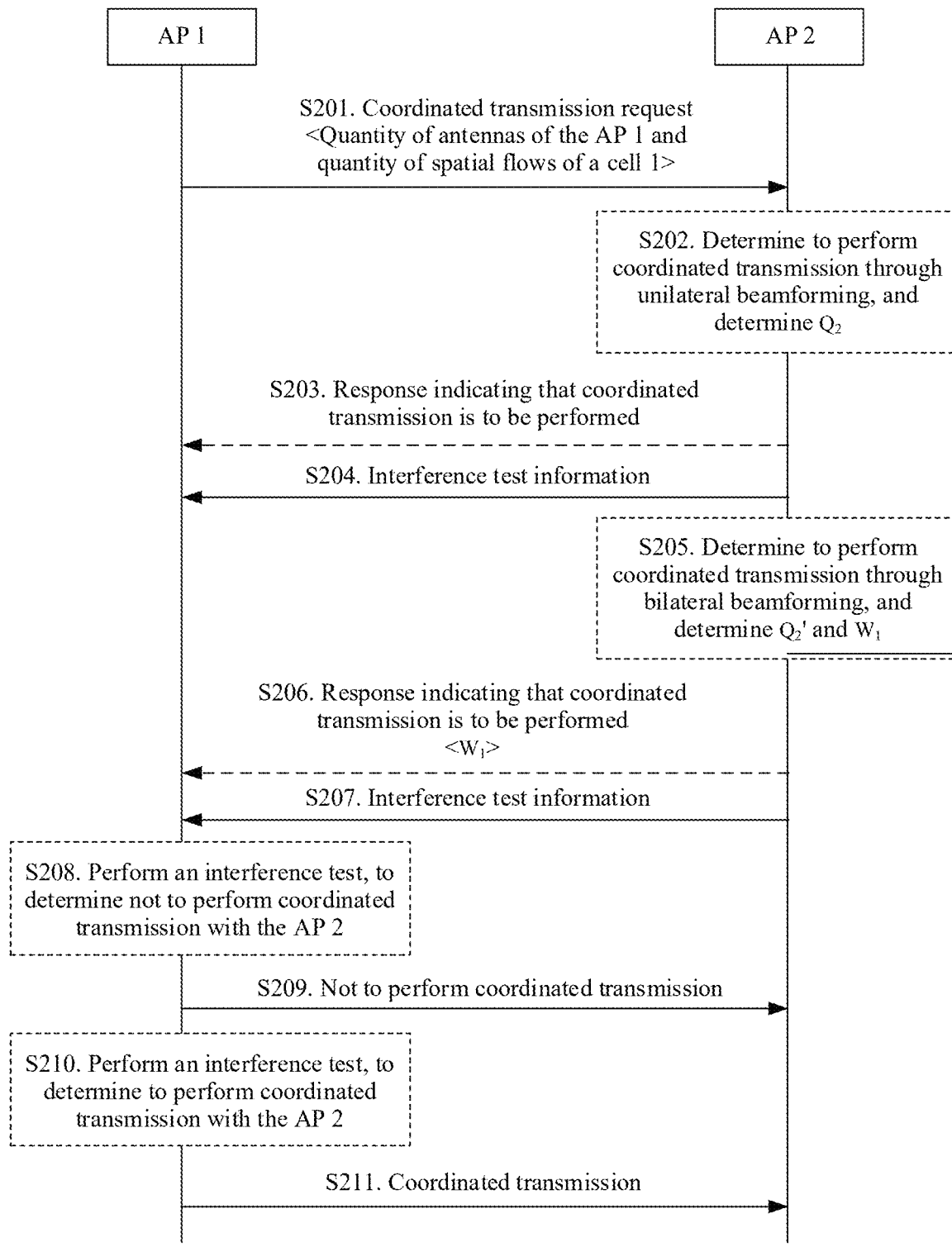
FIG. 4 is a flowchart of a second embodiment of a coordinated transmission control method according to at least one embodiment.

FIG. 4 is a flowchart of a second embodiment of a coordinated transmission control method according to at least one embodiment. A difference between this embodiment and Embodiment 1 lies in that: In this embodiment, a case in which an AP 2 determines to perform coordinated transmission is described, and transmission control procedures of coordinated transmission to be performed by the AP 2 in different conditions are specifically distinguished. Content that is the same as or similar to that in Embodiment 1 is not described in this embodiment again.

The method includes the following steps.

S201. An AP 1 sends a coordinated transmission request, and an AP 2 receives the coordinated transmission request sent by the AP 1, where the coordinated transmission request carries negotiation parameter information.

The carried negotiation parameter information mainly includes a quantity of antennas of the AP 1 and a quantity of spatial flows of a cell 1. This step is similar to S101 in Embodiment 1. For a detailed description, refer to S101. Details are not described herein again.

S202. The AP 2 determines, based on the negotiation parameter information, to perform coordinated transmission with the AP 1 through unilateral beamforming, and determines a precoding matrix $Q_2$ used by the AP 2 to send data.

The AP 2 determines, based on the quantity of spatial flows and information about the quantity of antennas of the AP 1 in combination with a quantity of antennas of the AP 2, whether the AP 2 performs coordinated transmission with the AP 1. In response to the quantity of spatial flows being less than or equal to the quantity of antennas of the AP 1, and the quantity of antennas of the AP 2 is greater than the quantity of antennas of the AP 1, the AP 2 unilaterally prevents, by using a reserved spatial direction, interference to uplink data reception performed by the AP 1, and therefore performs coordinated transmission. The precoding matrix $Q_2$ used to prevent interference to data reception performed by the AP 1 is selected for data transmission. Optionally, a selection criterion of $Q_2$ is $H_{21}Q_2=0$, where $H_{21}$ is channel estimation information between the AP 1 and the AP 2. At least one embodiment is not limited thereto.

S203. The AP 2 sends, to the AP 1, response information indicating that the AP 2 determines to perform coordinated transmission.

This step is an optional step, and interference test information sent in step S204 alternatively indicates that the AP 2 determines to perform coordinated transmission. An information format of the response information is a data packet structure shown in FIG. 7a, and a data field indicates that the AP 2 expects to perform coordinated transmission.

S204. The AP 2 sends the interference test information to the AP 1.

In response to step S203 being performed, the interference test information is sent together with the response information indicating that the AP 2 determines to perform coordinated transmission (for a specific information format, refer to FIG. 7b or FIG. 7c), or the interference test information is sent separately from the response information (for a specific information format, refer to FIG. 7d). The interference test information is sent by using the precoding matrix $Q_2$.

S205. The AP 2 determines, based on the negotiation parameter information, to perform coordinated transmission with the AP 1 through bilateral beamforming, and determines a precoding matrix $Q_2'$ used by the AP 2 to send data and a receive equalization matrix $W_1$ used by the AP 1 to receive data.

The AP 2 determines, based on the quantity of spatial flows and the information about the quantity of antennas of the AP 1 in combination with the quantity of antennas of the AP 2, whether the AP 2 performs coordinated transmission with the AP 1. In response to the quantity of spatial flows being less than the quantity of antennas of the AP 1, and the quantity of antennas of the AP 2 is less than or equal to the quantity of antennas of the AP 1, interference to uplink data reception performed by the AP 1 is prevented bilaterally by using reserved spatial directions, and therefore coordinated transmission is performed.

In response to determining that interference to uplink data reception performed by the AP 1 is prevented bilaterally by using the reserved spatial directions, the AP 2 not only needs to determine the precoding matrix $Q_2'$ of the AP 2 as a transmit end, but also needs to determine a receive equalization matrix used by the AP 1 to receive data, that is, the AP 2 performs transmit-end beamforming, and the AP 1 performs receive-end beamforming. $Q_2'$ of the AP 2 and $W_1$ of the AP 1 are determined according to the following optional standard: $W_1 H_{21} Q_2'=0$, where $H_{21}$ is channel estimation information between the AP 1 and the AP 2. At least one embodiment is not limited thereto.

S206. The AP 2 sends, to the AP 1, response information indicating that the AP 2 determines to perform coordinated transmission, where the response information carries indication information of the receive equalization matrix $W_1$ used by the AP 1 to receive data.

Figure 7E:
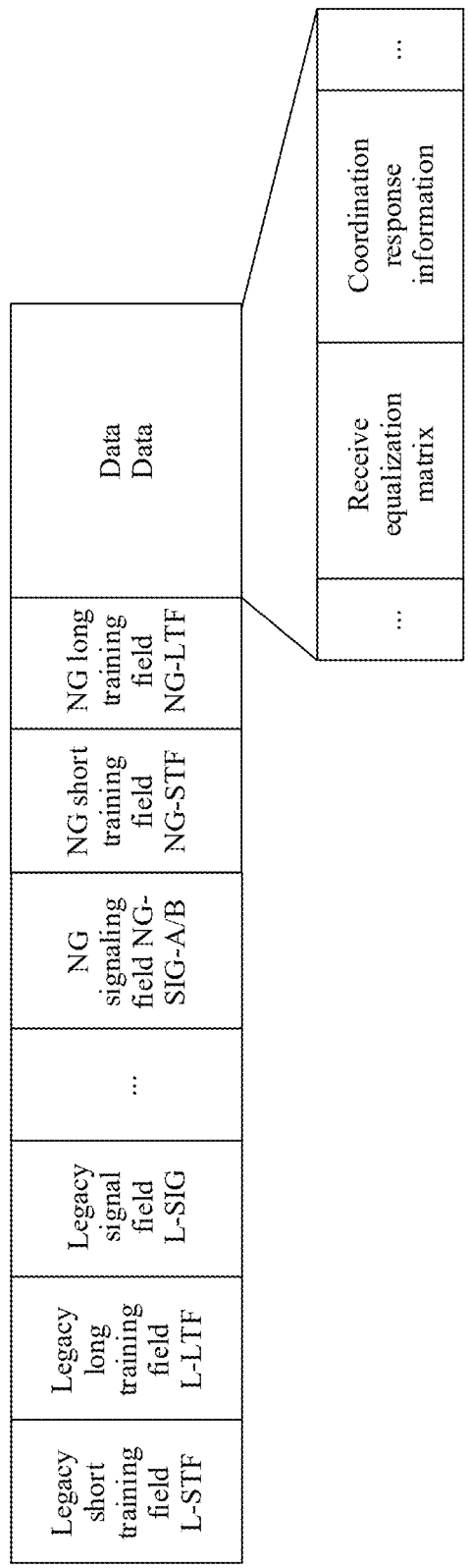
FIG. 7e is a schematic diagram of another information format of a coordinated (parallel) transmission response according to at least one embodiment.

An information format of the response information is a data packet structure shown in FIG. 7e. In addition to coordinated response information indicating whether the AP 2 is to perform coordinated transmission, a data field in the response information further carries information about the receive equalization matrix $W_1$ used by the AP 1 to receive data.

S207. The AP 2 sends interference test information to the AP 1.

Figure 7F:
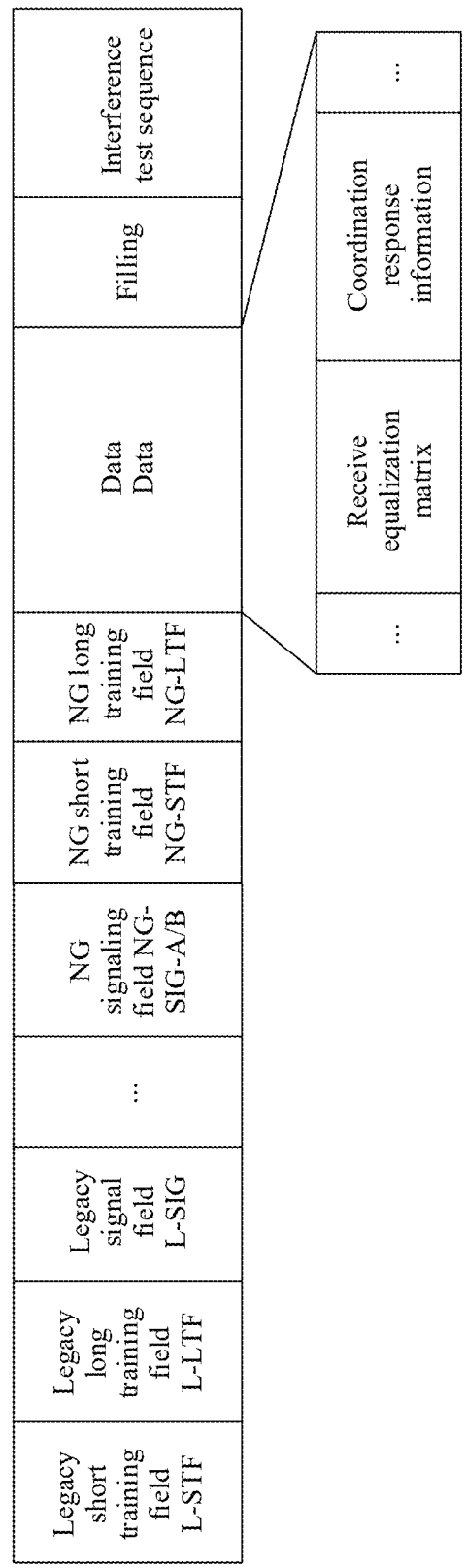
FIG. 7f is a schematic diagram of another information format of a coordinated (parallel) transmission response according to at least one embodiment.
Figure 7G:
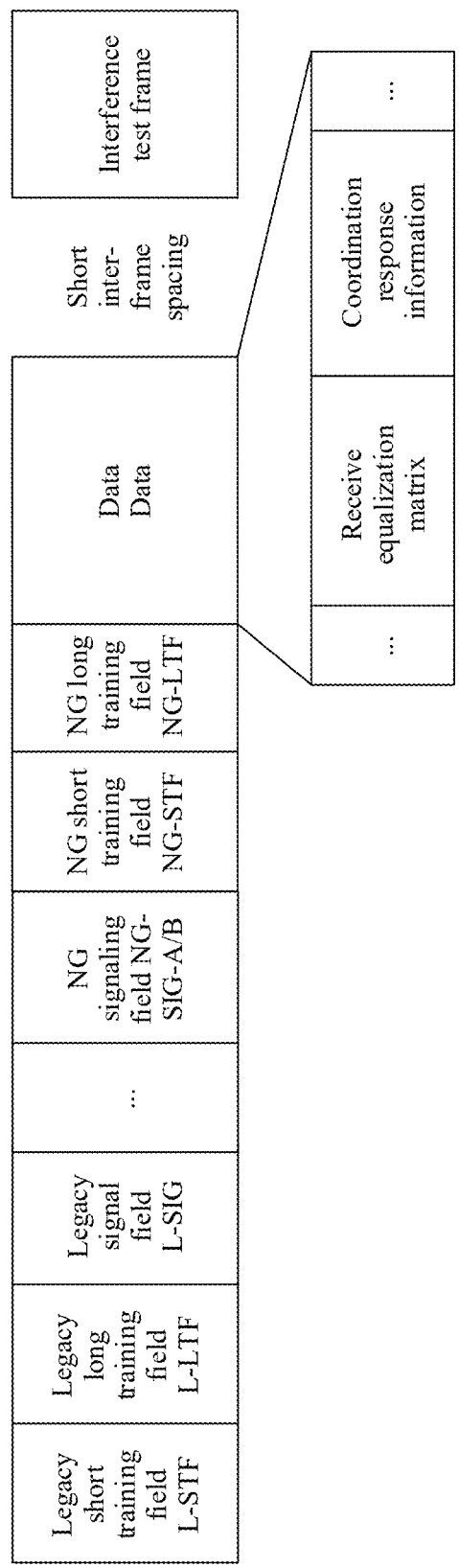
FIG. 7g is a schematic diagram of a transmission mode for coordinated (parallel) transmission response information and interference test information according to at least one embodiment.

The interference test information is sent together with or separately from the response information indicating that the AP 2 determines to perform coordinated transmission. In response to the interference test information being sent together with the response information, a frame structure shown in FIG. 7f is used. Similar to FIG. 7c, a padding field is provided between the data field and the interference test information, this field is used by the AP 1 to prepare to receive, by using the receive equalization matrix $W_1$ carried in the data field, the interference test information sent by the AP 2 by using $Q_2'$. In response to the interference test information being sent separately from the response information, a frame structure shown in FIG. 7g is used.

S202 to S204, and S205 to S207 are not necessarily performed in a particular order, and are merely different processing in different cases.

S208. The AP 1 performs an interference test based on the received interference test information, to determine not to perform coordinated transmission with the AP 2.

The AP 1 tests, by using the interference test information, whether interference to the AP 2 exceeds a predetermined threshold. For a case of S202 to S204, ideally, sending data processed by using $Q_2$ does not cause interference to the AP 1. However, in response to $Q_2$ obtained by the AP 2 not being accurate enough, or considering that the receive end in the cell uses another precoding matrix, interference is caused. In response to the interference exceeding the threshold, the AP 1 chooses not to perform coordinated transmission with the AP 2, and in response to the interference not exceeding the threshold, the AP 1 chooses to perform coordinated transmission with the AP 2. Optionally, in response to the interference being equal to the threshold, the AP 1 chooses not to perform coordinated transmission with the AP 2, or chooses to perform coordinated transmission with the AP 2.

For a case of S205 to S207, ideally, in response to the AP 1 receiving, by using $W_1$, data sent by using $Q_2'$, no interference is caused to the AP 1. However, in response to $Q_2'$ or $W_1$ obtained by the AP 2 not being accurate enough, or considering that the receive end in the cell uses another precoding matrix, and having considered receiving of data sent by a STA 1, the AP 1 does not use $W_1$ to receive data, interference is caused. In response to the interference exceeding the threshold, the AP 1 chooses not to perform coordinated transmission with the AP 2, and in response to the interference not exceeding the threshold, the AP 1 chooses to perform coordinated transmission with the AP 2. Optionally, in response to the interference being equal to the threshold, the AP 1 chooses not to perform coordinated transmission with the AP 2, or chooses to perform coordinated transmission with the AP 2.

S209. In response to choosing not to perform coordinated transmission with the AP 2, the AP 1 sends information indicating that the AP 1 is not to perform coordinated transmission with the AP 2.

This step is similar to S107 in Embodiment 1. For a detailed description, refer to S107. Details are not described herein again.

S210. The AP 1 performs the interference test based on the received interference test information, to determine to perform coordinated transmission with the AP 2.

The AP 1 tests, by using the interference test information, whether interference to the AP 2 exceeds the predetermined threshold; and in response to the interference not exceeding the threshold, chooses to perform coordinated transmission with the AP 2. Optionally, in response to the interference being equal to the threshold, the AP 1 chooses to perform coordinated transmission with the AP 2.

S211. In response to choosing to perform coordinated transmission with the AP 2, the AP 1 sends information indicating that the AP 1 is to perform coordinated transmission with the AP 2.

In response to the AP 1 choosing to perform coordinated transmission, in a case of unilateral beamforming, after receiving a coordination acknowledgment frame or a trigger frame, the AP 2 sends downlink data to a to-be-scheduled STA 2 by using $Q_2$, to perform coordinated transmission with the AP 1. In a case of bilateral beamforming, after receiving the coordination acknowledgment frame or the trigger frame, the AP 2 sends downlink data to the to-be-scheduled STA 2 by using $Q_2'$, and the AP 1 receives, by using $W_1$, uplink data sent by the scheduled STA 1. Transmission of the AP 2 and the AP 1 ends at the same time, or downlink transmission of the AP 2 ends earlier than uplink transmission of the AP 1. Time information of the uplink transmission of the AP 1 is carried in any one of the foregoing messages or frames.

This step is similar to S109 in Embodiment 1. For other related detailed descriptions, refer to S109. Details are not described herein again.

S208 and S209, and S210 and S211 are not necessarily performed in a particular order, and are merely different processing in different cases.

According to the coordinated transmission control method in at least one embodiment, an anti-interference beamforming manner is determined based on a specific cell configuration parameter, and whether to perform coordinated transmission is determined based on a dual decision condition of an interference test, so that a spatial control manner for beamforming is used to prevent unnecessary retransmission resulting from interference caused during actual coordinated transmission, thereby improving communication efficiency.

Embodiment 3

Figure 5:
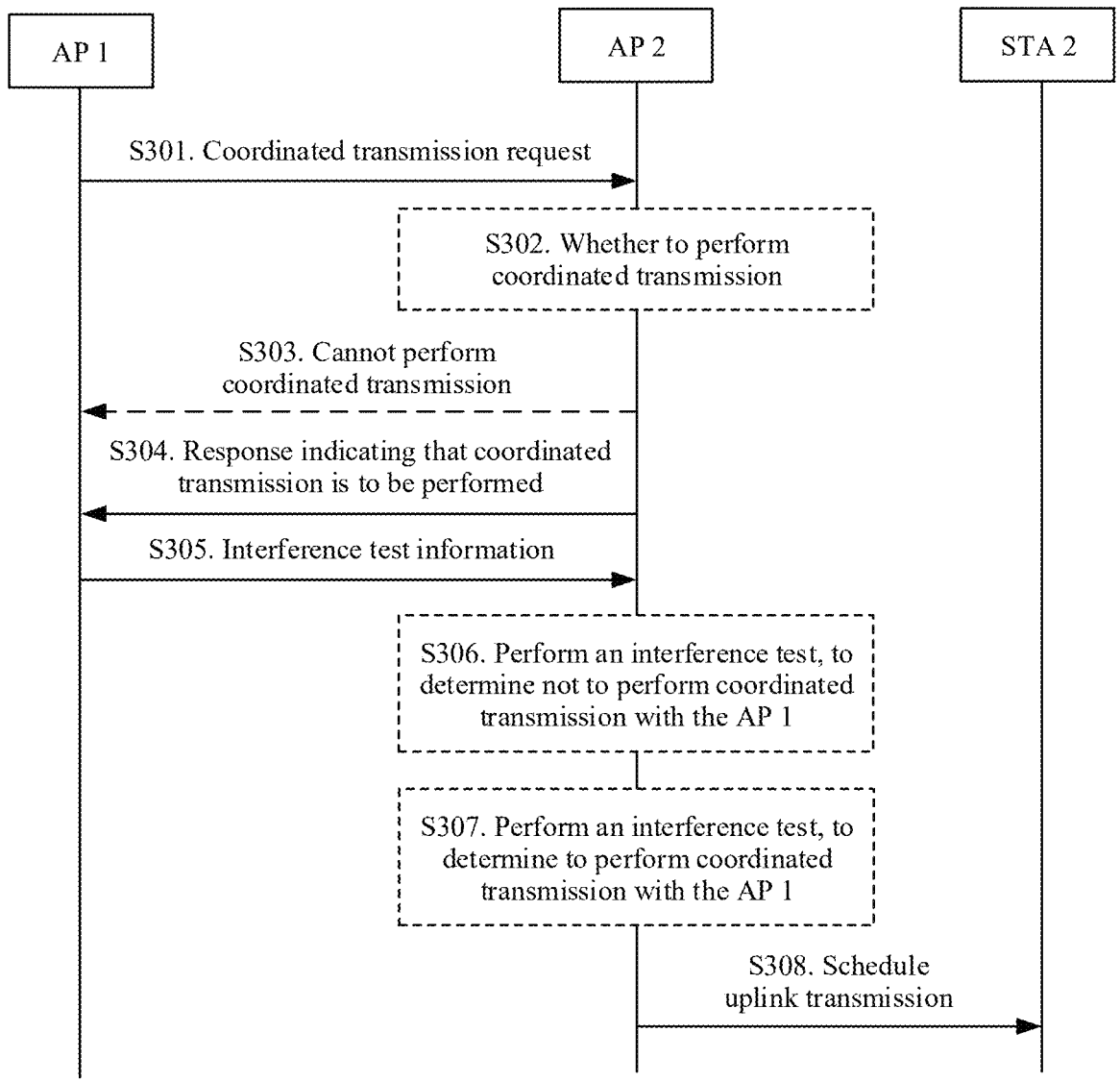
FIG. 5 is a flowchart of a first embodiment of another coordinated transmission control method according to at least one embodiment.

According to at least one embodiment, FIG. 5 is a flowchart of a first embodiment of another coordinated transmission control method according to at least one embodiment. This embodiment is described by using a scenario in which a primary access point AP 1 is to perform downlink transmission and a secondary access point AP 2 is to perform uplink transmission as an example, but no limitation is set thereto. A station correspondingly scheduled by the AP 1 is a STA 1, and a station correspondingly scheduled by the AP 2 is a STA 2. To facilitate understanding of the solution, overall descriptions of this embodiment and subsequent embodiments are provided from a perspective of a plurality of interacting parties. However, this certainly does not mean that steps on all interacting sides in a system are required to be performed together. In the technical solution proposed in at least one embodiment, an improvement is made on each side of the system. Explanation and details of content the same as that in the foregoing embodiments are not described herein again.

The method includes the following steps.

S301. The AP 1 sends a coordinated transmission request, and the AP 2 receives the coordinated transmission request sent by the AP 1, where the coordinated transmission request carries negotiation parameter information.

After an AP obtains a right to use a channel or is elected from the system, the AP is determined as a primary AP (that is, the AP 1), other APs in the system are secondary APs (for example, the AP 2 and an AP 3). In this case, data transmission of the AP 1 and scheduling of the station STA 1 corresponding to the AP 1 need to be ensured in the system. The AP 1 determines to schedule the STA 1 to perform uplink transmission, and sends the coordinated transmission request to at least secondary AP (for example, the AP 2). Optionally, an action (Action) frame is used as an information format of the coordinated transmission request. For a specific structure of the frame, refer to FIG. 3. The coordinated transmission request carries negotiation parameter information, optionally including at least one of the following: a quantity of antennas of the AP 1, a quantity of spatial flows in a cell 1 served by the AP 1, a basic service set color (Basic Service Set Color, BSS Color for short) used to identify a cell served by the AP 1, a transmitter address (that is, an address of the AP 1), an uplink/downlink indication used to indicate whether the AP 1 is to perform uplink transmission or to perform downlink transmission (the AP 1 is to perform downlink transmission in this embodiment), a receiver address (that is, an address of the AP 2), and a bandwidth/resource block used by the STA 1 to receive data. The foregoing parameter information does not constitute any limitation on this application. For example, the parameter information further includes transmit power and modulation and coding information.

S302. The AP 2 determines, based on the negotiation parameter information, whether to perform coordinated transmission with the AP 1.

The AP 2 determines, based on the negotiation parameter information, whether to perform coordinated transmission with the AP 1. For example, the AP 2 determines, based on the quantity of spatial flows and information about the quantity of antennas of the AP 1 in combination with a quantity of antennas of the AP 2, whether the AP 2 performs coordinated transmission with the AP 1. For example, in response to the quantity of spatial flows being equal to the quantity of antennas of the AP 1, and the quantity of antennas of the AP 2 is less than or equal to the quantity of antennas of the AP 1, the AP 2 cannot prevent, by using a reserved spatial direction, interference to uplink data reception performed by the AP 1, and therefore cannot perform coordinated transmission; and in response to the quantity of spatial flows being less than or equal to the quantity of antennas of the AP 1, and the quantity of antennas of the AP 2 is greater than the quantity of antennas of the AP 1, or in response to the quantity of spatial flows being less than the quantity of antennas of the AP 1, and the quantity of antennas of the AP 2 is less than or equal to the quantity of antennas of the AP 1, the AP 2 prevents, by using a reserved spatial direction, interference to uplink data reception performed by the AP 1, and therefore performs coordinated transmission. The foregoing is merely an example of this application. A manner in which the AP 2 determines whether to coordinate with the AP 1 is not limited thereto.

S303. In response to determining not to perform coordinated transmission with the AP 1, the AP 2 feeds back, to the AP 1, information indicating that the AP 2 cannot perform coordinated transmission.

This step is an optional step. In response to determining not to perform coordinated transmission with the AP 1, the AP 2 feeds back, by using this step, the information indicating that the AP 2 cannot perform coordinated transmission, to notify the AP 1. Optionally, in response to determining not to perform coordinated transmission with the AP 1, the AP 2 does not reply to the coordinated transmission request within a preset time, so that the AP 1 determines that the AP 2 cannot perform coordinated transmission. In this case, an operation of this step is not used.

In response to the AP 2 not being able to perform coordinated transmission, the AP 1 continues to select a secondary AP (for example, the AP 3) in another cell to perform coordinated transmission, or perform single-cell transmission.

S304. In response to determining to perform coordinated transmission with the AP 1, the AP 2 sends, to the AP 1, response information indicating that the AP 2 determines to perform coordinated transmission.

In response to determining to perform coordinated transmission with the AP 1, the AP 2 sends, to the AP 1, response information indicating that the AP 2 determines to perform coordinated transmission. The response information is sent by using a coordinated transmission response frame, and an information format of the response information is an existing information format. As shown in FIG. 7*a*, for a specific description, refer to the related description in Embodiment 1. Details are not described herein again. The data field indicates that the AP 2 expects to perform coordinated transmission.

S305. The AP 1 sends interference test information, and the AP 2 receives the interference test information.

There are two optional implementations for sending the interference test information by the AP 1. A first implementation is that the AP 1 separately sends the interference test information to the AP 2, and a second implementation is that the AP 1 reuses a downlink data packet sent to the STA 1 as the interference test information, and omnidirectionally send the downlink data packet, so that the AP 2 receives the interference test information. There are two cases for the second implementation. One case is that before formally sending a downlink data packet to the STA 1, the AP 1 first sends a separate downlink data packet to the STA 1 in advance to test interference; and the other case is that a downlink data packet formally sent by the AP 1 to the STA 1 is used to test interference. The data packet is in an existing information format, as shown in FIG. 7*b* and FIG. 7*g*. An NG-STF portion and an NG-LTF portion is used as test sequences.

The AP 2 receives the interference test information by using a receive equalization matrix $W_2$ used to prevent the AP 1 from causing interference to data reception performed by the AP 2. Alternatively, considering a transmit-end status in a cell served by the AP 2, the AP 2 receives the interference test information by using another precoding matrix. Optionally, a selection standard of $W_2$ is $H_{21}W_2=0$, where $H_{21}$ is channel estimation information between the AP 1 and the AP 2. At least one embodiment is not limited thereto.

S306. The AP 2 performs an interference test based on the interference test information, to determine not to perform coordinated transmission with the AP 1.

The AP 2 tests, by using the interference test information, whether interference to the AP 1 exceeds a predetermined threshold; and in response to the interference exceeding the threshold, chooses not to perform coordinated transmission with the AP 1. In this case, the AP 2 does not schedule the STA 2 corresponding to the AP 2, and does not schedule the STA 2 to perform uplink data transmission. Because downlink data transmission between the STA 1 and the AP 1 needs to be ensured, regardless of whether the AP 2 participates in coordinated transmission, the downlink data transmission of the AP 1 is not affected. Optionally, in response to the interference being equal to the threshold, the AP 2 determines not to perform coordinated transmission with the AP 1.

S307. The AP 2 performs the interference test based on the interference test information, to determine to perform coordinated transmission with the AP 1.

The AP 2 tests, by using the interference test information, whether interference to the AP 1 exceeds the predetermined threshold; and in response to the interference not exceeding the threshold, chooses to perform coordinated transmission with the AP 1. Optionally, in response to the interference being equal to the threshold, the AP 2 determines to perform coordinated transmission with the AP 1.

S308. In response to choosing to perform coordinated transmission with the AP 1, the AP 2 schedules the STA 2 to perform uplink data transmission.

To schedule the STA 2 to perform the uplink data transmission, the AP 2 sends a trigger frame to the STA 2.

Based on different forms used by the AP 1 to send the interference test information in S305, a form used by the AP 2 to send the trigger frame and schedule the STA 2 to perform the uplink data transmission varies.

Figure 8A:
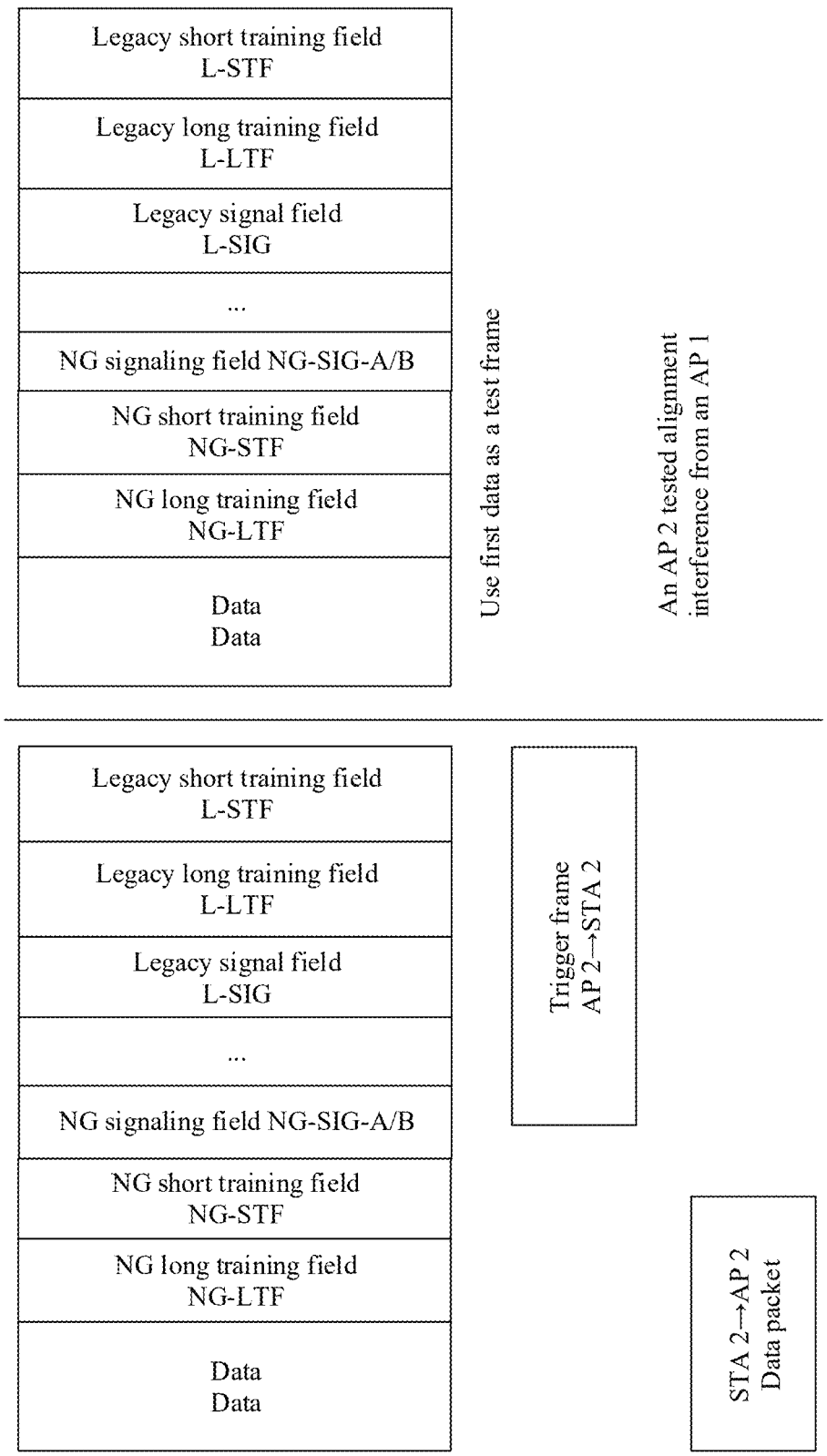
FIG. 8a is a schematic diagram of a scheduling occasion of an AP 2 according to at least one embodiment.

The case in which the AP 1 separately sends the interference test information to the AP 2, or the AP 1 first sends the separate downlink data packet to the STA 1 in advance to test interference is shown in a schematic diagram, shown in FIG. 8*a*, of a scheduling occasion of the AP 2. Transmission of the trigger frame starts before transmission of a data field in a downlink data packet of a next frame formally sent by the AP 1 to the STA 1 ends, starts at the same time as transmission of the downlink data packet of the next frame, or starts at any moment in a transmission process of the downlink data packet of the next frame, but uplink data transmission of the scheduled second STA needs to end before the transmission of the data field in the downlink data packet of the next frame ends, or end at the same time as the transmission of the data field in the downlink data packet of the next frame.

Figure 8B:
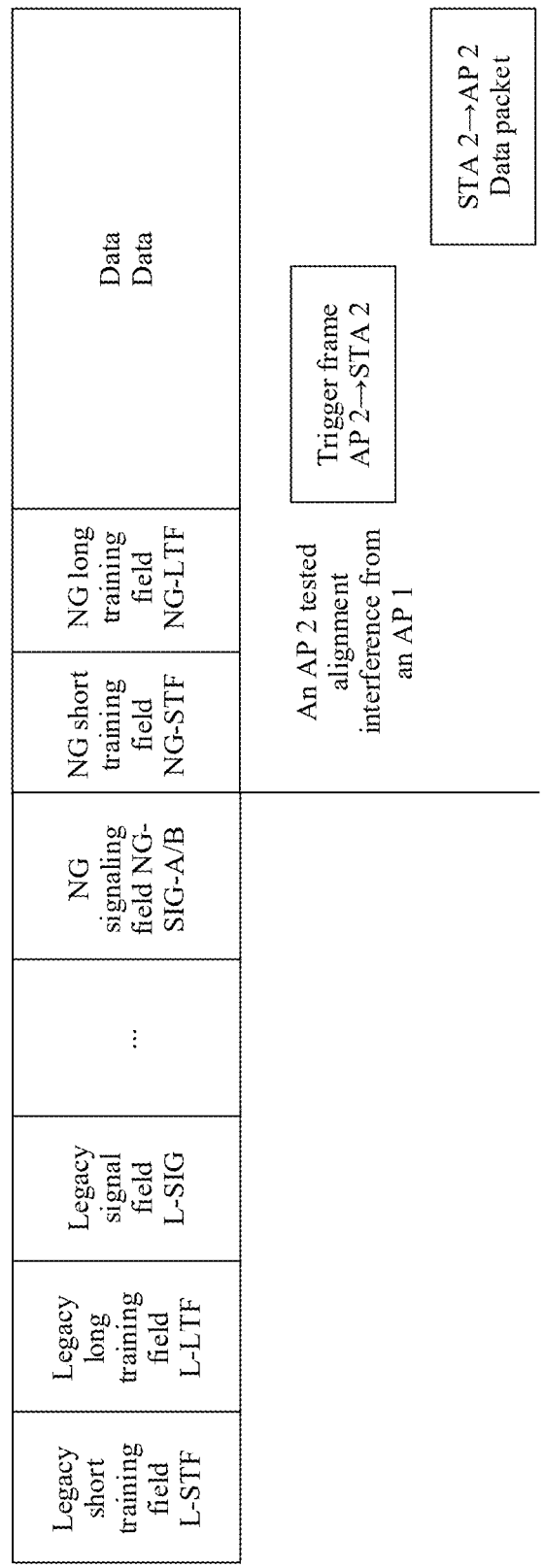
FIG. 8b is another schematic diagram of a scheduling occasion of an AP 2 according to at least one embodiment.

The case in which the downlink data packet formally sent by the AP 1 to the STA 1 is used to test interference, and a corresponding training field, such as a next generation short training field (Next Generation Short Training Field, NG-STF for short) part and a next generation long training field (Next Generation Long Training Field, NG-LTF for short) part, is used as a test sequence is shown in a schematic diagram, shown in FIG. 8*b*, of a scheduling occasion of the AP 2, transmission of the trigger frame starts in a transmission process of the downlink data packet, and uplink data transmission of the scheduled second STA ends before transmission of a data field in the downlink data packet ends, or ends at the same time as the transmission of the data field in the downlink data packet.

S303, S304, and S305 are not necessarily performed in a particular order, and are merely different processing in different cases. S306, S307, and S308 are not necessarily performed in a particular order, and are merely different processing in different cases.

According to the coordinated transmission control method in at least one embodiment, whether to perform coordinated transmission is determined through inter-cell configuration parameter sharing and based on a dual decision condition of an interference test, so that the access points learn an interference status in advance, thereby preventing unnecessary retransmission resulting from interference caused during actual coordinated transmission, and improving communication efficiency.

Embodiment 4

Figure 6:
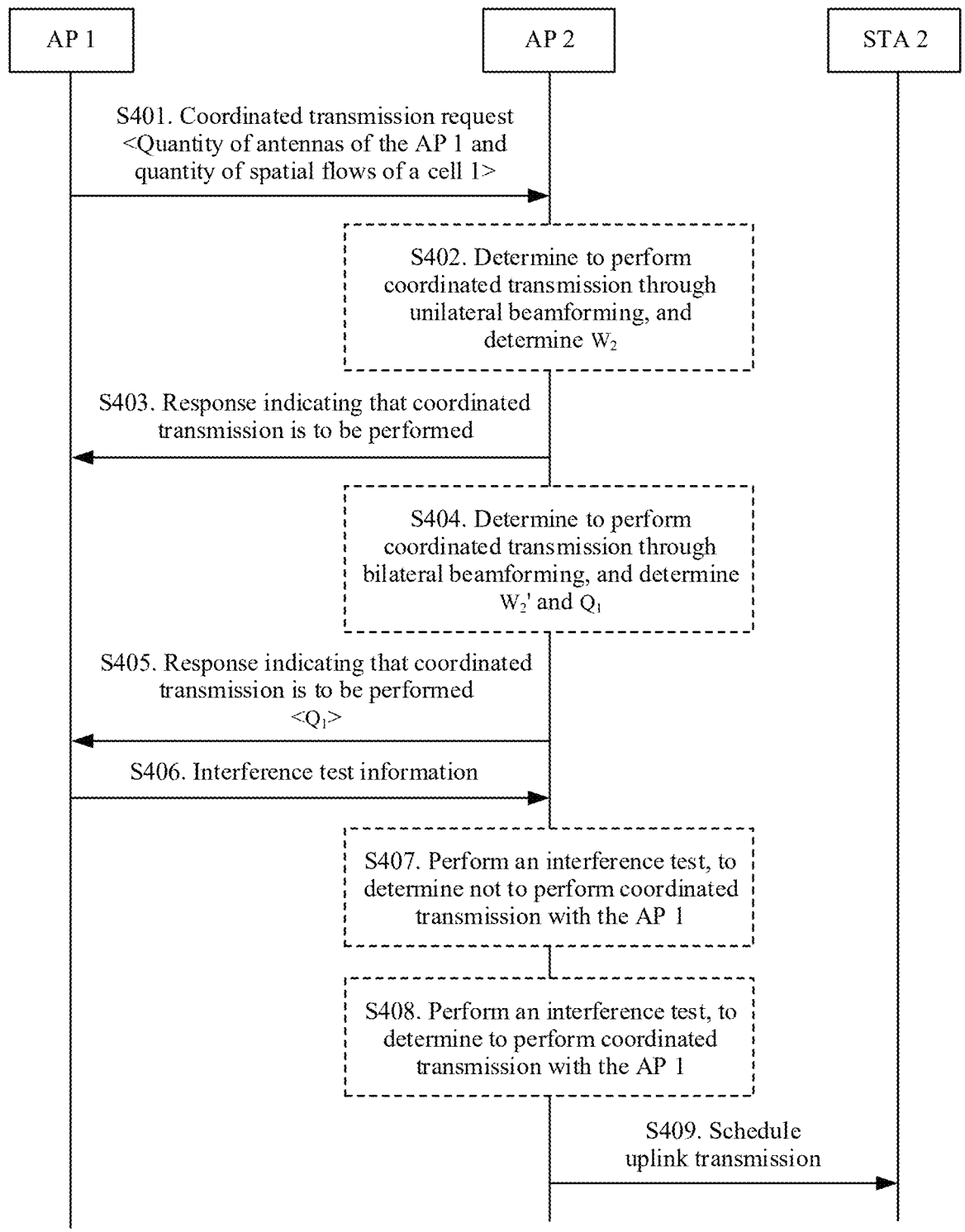
FIG. 6 is a flowchart of a second embodiment of another coordinated transmission control method according to at least one embodiment.

FIG. 6 is a flowchart of a second embodiment of another coordinated transmission control method according to at least one embodiment. A difference between this embodiment and Embodiment 3 lies in that: In this embodiment, a case in which an AP 2 determines to perform coordinated transmission is described, and transmission control procedures of coordinated transmission to be performed by the AP 2 in different conditions are specifically distinguished. Content that is the same as or similar to that in Embodiment 3 is not described in this embodiment again.

The method includes the following steps.

S401. An AP 1 sends a coordinated transmission request, and the AP 2 receives the coordinated transmission request sent by the AP 1, where the coordinated transmission request carries negotiation parameter information.

The carried negotiation parameter information mainly includes a quantity of antennas of the AP 1 and a quantity of spatial flows of a cell 1. This step is similar to S301 in Embodiment 3. For a detailed description, refer to S301. Details are not described herein again.

S402. The AP 2 determines, based on the negotiation parameter information, to perform coordinated transmission with the AP 1 through unilateral beamforming, and determines a receive equalization matrix $W_2$.

The AP 2 determines, based on the quantity of spatial flows and information about the quantity of antennas of the AP 1 in combination with a quantity of antennas of the AP 2, whether the AP 2 performs coordinated transmission with the AP 1. In response to the quantity of spatial flows being less than or equal to the quantity of antennas of the AP 1, and the quantity of antennas of the AP 2 is greater than the quantity of antennas of the AP 1, the AP 2 unilaterally performs receive beamforming on data received by the AP 2 to prevent the AP 1 from causing interference to uplink data reception performed by the AP 2, and therefore performs coordinated transmission.

The AP 2 receives data by using the receive equalization matrix $W_2$ used to prevent the AP 1 from causing interference to data reception performed by the AP 2. Optionally, a selection criterion of $W_2$ is $H_{21}W_2=0$, where $H_{21}$ is channel estimation information between the AP 1 and the AP 2. At least one embodiment is not limited thereto.

S403. In response to determining to perform coordinated transmission with the AP 1, the AP 2 sends, to the AP 1, response information indicating that the AP 2 determines to perform coordinated transmission.

In response to determining to perform coordinated transmission with the AP 1, the AP 2 sends, to the AP 1, the response information indicating that the AP 2 determines to perform coordinated transmission. The response information is sent by using a coordinated transmission response frame, and an information format of the response information is an existing information format. As shown in FIG. 7a, for a specific description, refer to the related description in the foregoing embodiments. Details are not described herein again. The data field indicates that the AP 2 expects to perform coordinated transmission.

S404. The AP 2 determines, based on the negotiation parameter information, to perform coordinated transmission with the AP 1 through bilateral beamforming, and determines a receive equalization matrix $W_2'$ and a precoding matrix $Q_1$ used by the AP 1 to send data.

The AP 2 determines, based on the quantity of spatial flows and the information about the quantity of antennas of the AP 1 in combination with the quantity of antennas of the AP 2, whether the AP 2 performs coordinated transmission with the AP 1. In response to the quantity of spatial flows being less than the quantity of antennas of the AP 1, and the quantity of antennas of the AP 2 is less than or equal to the quantity of antennas of the AP 1, interference caused by the AP 1 to uplink data reception performed by the AP 2 is prevented bilaterally by using reserved spatial directions, and therefore coordinated transmission is performed. The AP 2 not only needs to determine the receive equalization matrix $W_2'$ used by the AP 2 to receive data, but also needs to determine a precoding matrix $Q_1$ used by the AP 1 to send data, that is, the AP 1 performs transmit-end beamforming, and the AP 2 performs receive-end beamforming. $Q_1$ of the AP 1 and $W_2'$ of the AP 2 are determined according to the following optional standard: $W_2'H_{21}Q_1=0$, where $H_{21}$ is channel estimation information between the AP 1 and the AP 2. At least one embodiment is not limited thereto.

S405. In response to determining to perform coordinated transmission with the AP 1, the AP 2 sends, to the AP 1, response information indicating that the AP 2 determines to perform coordinated transmission and indication information of the precoding matrix $Q_1$ of the AP 1.

Figure 7H:
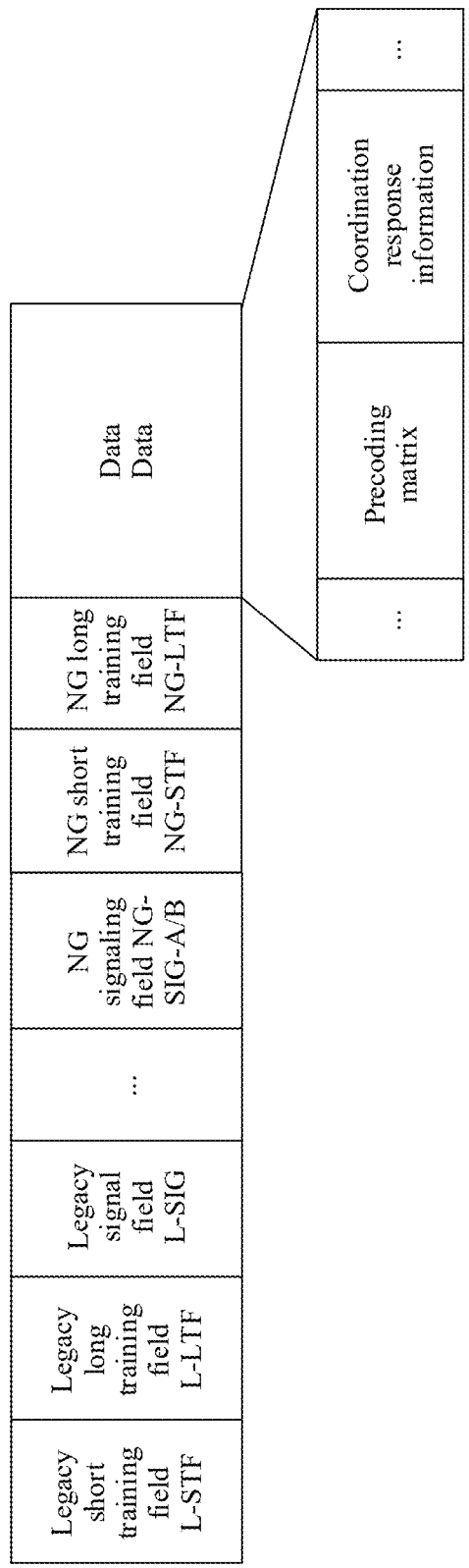
FIG. 7h is a schematic diagram of another information format of a coordinated (parallel) transmission response according to at least one embodiment.

In response to determining to perform coordinated transmission with the AP 1, the AP 2 sends, to the AP 1, the response information indicating that the AP 2 determines to perform coordinated transmission. The response information is sent by using a coordinated transmission response frame, and an information format of the response information is an existing information format, as shown in FIG. 7h. In addition to coordinated response information indicating whether the AP 2 is to perform coordinated transmission, a data field in the response information further carries information about the precoding matrix $Q_1$ used by the AP 1 to send data.

S406. The AP 1 sends interference test information, and the AP 2 receives the interference test information.

There are two optional implementations for sending the interference test information by the AP 1. A first implementation is that the AP 1 separately sends the interference test information to the AP 2, and a second implementation is that the AP 1 reuses a downlink data packet sent to a STA 1 as the interference test information, and omnidirectionally send the downlink data packet, so that the AP 2 receives the interference test information. There are two cases for the second implementation. One case is that before formally sending a downlink data packet to the STA 1, the AP 1 first sends a separate downlink data packet to the STA 1 in advance to test interference; and the other case is that a downlink data packet formally sent by the AP 1 to the STA 1 is used to test interference. The data packet is in an existing information format, as shown in FIG. 7b and FIG. 7g. The NG-STF portion and the NG-LTF portion is used as test sequences.

The AP 2 receives data by using a receive equalization matrix used to prevent the AP 1 from causing interference to data reception performed the AP 2. Alternatively, considering a transmit-end status in a cell served by the AP 2, the AP 2 receives data by using another precoding matrix.

S407. The AP 2 performs an interference test based on the interference test information, to determine not to perform coordinated transmission with the AP 1.

The AP 2 tests, by using the interference test information, whether interference to the AP 1 exceeds a predetermined threshold (optional, the interference to the AP 1 is equal to the threshold). In a case of unilateral beamforming, ideally, in response to the AP 2 receiving data by using $W_2$, the AP 1 does not cause interference to the AP 2. However, in response to $W_2$ obtained by the AP 2 not being accurate enough, or considering that the transmit end in the cell uses another precoding matrix, interference is caused. In a case of bilateral beamforming, ideally, in response to the AP 1 sending data by using $Q_1$ and the AP 2 receives data by using $W_2'$, the AP 1 does not cause interference to the AP 2. However, in response to $Q_1$ or $W_2'$ obtained by the AP 2 not being accurate enough, or considering that the receive end in the cell uses another precoding matrix or the AP 2 uses another receive equalization matrix, interference is caused.

In response to the interference exceeding the threshold (optional, the interference is equal to the threshold), the AP 2 chooses not to perform coordinated transmission with the AP 1. In this case, the AP 2 does not schedule a STA 2 corresponding to the AP 2, and does not schedule the STA 2 to perform uplink data transmission. Because downlink data transmission between the STA 1 and the AP 1 needs to be ensured, regardless of whether the AP 2 participates in coordinated transmission, downlink data transmission of the AP 1 is not affected.

S408. The AP 2 performs the interference test based on the interference test information, to determine to perform coordinated transmission with the AP 1.

The AP 2 tests, by using the interference test information, whether interference to the AP 1 exceeds the predetermined threshold; and in response to the interference not exceeding the threshold, chooses to perform coordinated transmission with the AP 1. Optionally, in response to the interference being equal to the predetermined threshold, the AP 2 determines to perform coordinated transmission with the AP 1.

S409. In response to choosing to perform coordinated transmission with the AP 1, the AP 2 schedules the STA 2 to perform uplink data transmission.

To schedule the STA 2 to perform the uplink data transmission, the AP 2 sends a trigger frame to the STA 2.

Based on different forms used by the AP 1 to send the interference test information in S406, a form used by the AP 2 to send the trigger frame and schedule the STA 2 to perform the uplink data transmission varies.

The case in which the AP 1 separately sends the interference test information to the AP 2, or the AP 1 first sends the separate downlink data packet to the STA 1 in advance to test interference is shown in a schematic diagram, shown in FIG. 8a, of a scheduling occasion of the AP 2. Transmission of the trigger frame starts before transmission of a data field in a downlink data packet of a next frame formally sent by the AP 1 to the STA 1 ends, and uplink data transmission of the scheduled second STA ends before the transmission of the data field in the downlink data packet of the next frame ends, or ends at the same time as the transmission of the data field in the downlink data packet of the next frame.

The case in which the downlink data packet formally sent by the AP 1 to the STA 1 is used to test interference, and an NG-STF part and an NG-LTF part is used as test sequences is shown in a schematic diagram, shown in FIG. 8b, of a scheduling occasion of the AP 2, transmission of the trigger frame starts in a transmission process of the downlink data packet, and uplink data transmission of the scheduled second STA ends before transmission of a data field in the downlink data packet ends, or ends at the same time as the transmission of the data field in the downlink data packet.

S402 and S403, and S404 and S405 are not necessarily performed in a particular order, and are merely different processing in different cases. S407, S408, and S409 are not necessarily performed in a particular order, and are merely different processing in different cases.

According to the coordinated transmission control method in at least one embodiment, an anti-interference beamforming manner is determined based on a specific cell configuration parameter, and whether to perform coordinated transmission is determined based on a dual decision condition of an interference test, so that a spatial control manner for beamforming is used to prevent unnecessary retransmission resulting from interference caused during actual coordinated transmission, thereby improving communication efficiency.

Embodiments described herein are all described by using APs. In some scenarios, a station STA is also equivalent to the foregoing primary AP or secondary AP, to implement the foregoing method embodiments.

The foregoing describes the solutions provided in at least one embodiment mainly by using a procedure in which various entities in the system interact with each other to perform coordinated transmission control. To implement the foregoing functions, the foregoing various entities include hardware structures and/or software modules corresponding to the various functions. A person of ordinary skill in the art should easily be aware that, in combination with the examples described in the embodiments disclosed in this specification, units, algorithms steps is implemented by hardware or a combination of hardware and computer software. Whether a function is performed by hardware or hardware driven by computer software depends on particular applications and design constraints of the technical solutions. A person skilled in the art is able to use different methods to implement the described functions for each particular application, but it should not be considered that the implementation goes beyond the scope of embodiments described herein.

Figure 9:
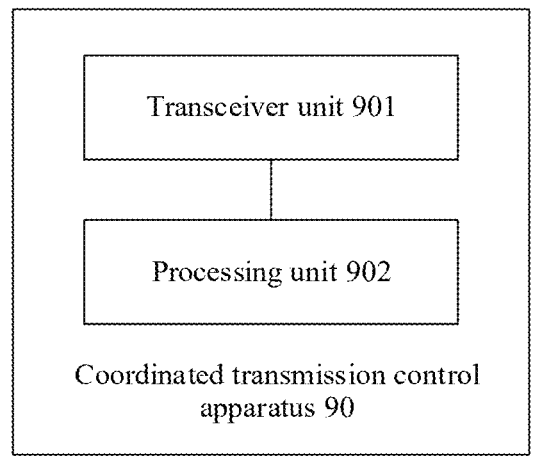
FIG. 9 is a simplified schematic structural diagram of a coordinated transmission control apparatus according to at least one embodiment.

In at least one embodiment, the primary AP and the secondary AP is divided into function modules based on the foregoing method examples. For example, function modules corresponding to various functions are obtained through division, or two or more functions is integrated into one processing module. The integrated module is implemented in a form of hardware, or is implemented in a form of a software function module. FIG. 9 is a simplified schematic structural diagram of a coordinated transmission control apparatus according to at least one embodiment. The apparatus 90 includes corresponding function modules: a transceiver unit 901 and a processing unit 902. In response to the apparatus being an apparatus on a secondary AP side, the apparatus is configured to implement a related function of the secondary AP (AP 2). in response to the apparatus being an apparatus on a primary AP side, the apparatus is configured to implement a related function of the primary AP (AP 1). The transceiver unit 901 is configured to implement a related function of receiving and sending information or data by the AP 1/AP 2, and the processing unit 902 is configured to implement a related function of processing information or data by the AP 1/AP 2. For details, refer to descriptions of implementation of a related network device below. Details are not described herein again. In at least one embodiment, module division is used as an example, and is merely a logical function division. In actual implementation, another division manner is used. The following describes an example in which various function modules corresponding various functions are obtained.

Figure 10:
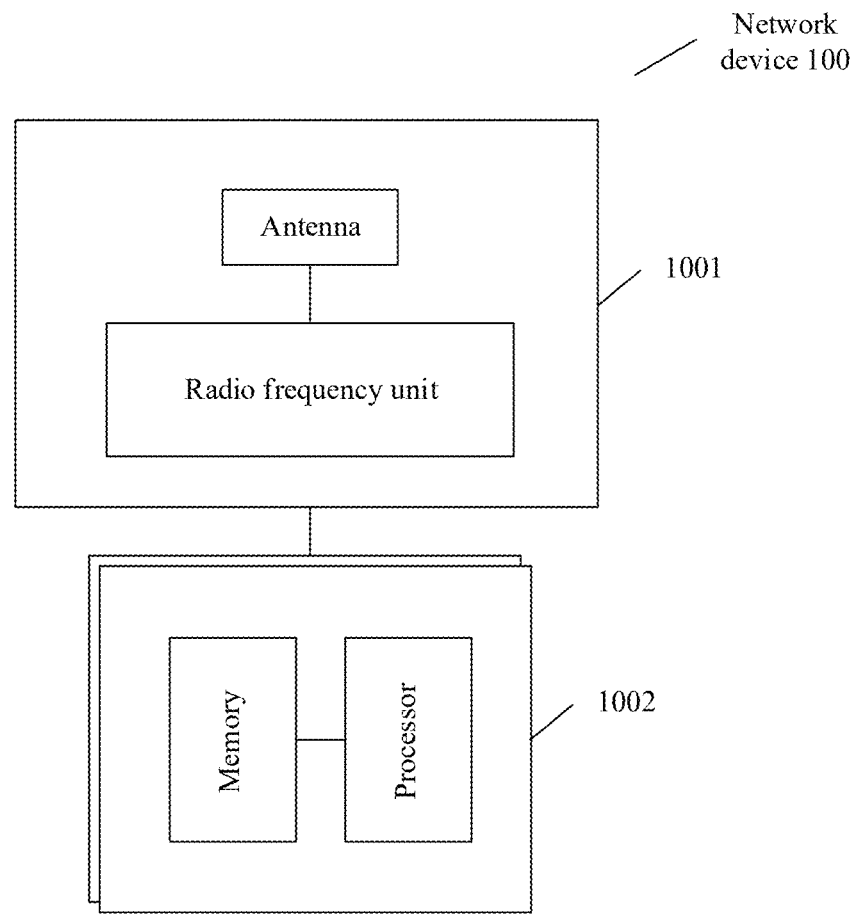
FIG. 10 is a simplified schematic structural diagram of a network device according to at least one embodiment.

An embodiment further provides a network device. The network device is used as a coordinated transmission control apparatus on an access point AP side, and is configured to perform the steps performed by the AP 1 or the AP 2 in any one of FIG. 2 and FIG. 4 to FIG. 6. The network device is alternatively a station STA that has a capability of implementing the foregoing methods and that is equivalent to the AP 1 or the AP 2. FIG. 10 is a simplified schematic structural diagram of the network device. The network device 100 includes a part 1001 and a part 1002. The part 1001 is mainly configured to receive and send a radio frequency signal and perform conversion on a radio frequency signal and a baseband signal. The part 1002 is mainly configured to perform baseband processing, control the network device 100, and the like. The part 1001 is usually referred to as a transceiver unit, a transceiver machine, a transceiver circuit, a transceiver, or the like. The part 1002 is usually a control center of the network device 100, and is usually referred to as a processing unit, a control unit, a processor, a controller, or the like, and is configured to control the network device 100 to perform the steps performed by the AP 1 or the AP 2 in the foregoing related embodiments. For details, refer to the foregoing descriptions of the related parts.

A transceiver unit of the part 1001 is also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 1001 is considered as a receiving unit, and a component for implementing a sending function is considered as a sending unit. That is, the part 1001 includes a receiving unit and a sending unit. The receiving unit is also referred to as a receiver machine, a receiver, a receiver circuit, or the like. The sending unit is referred to as a transmitter machine, a transmitter, a transmitter circuit, or the like.

The part 1002 includes one or more boards. Each board includes one or more processors and one or more memories. The processor is configured to read and execute a program in the memory, to implement a baseband processing function and control the network device 100. In response to there being a plurality of boards, the boards is interconnected to enhance a processing capability. In an optional implementation, the plurality of boards share one or more processors, or the plurality of boards share one or more memories, or the plurality of boards simultaneously share one or more processors. The memory and the processor is integrated together, or is disposed independently. In some embodiments, the part 1001 and the part 1002 is integrated together or is disposed independently. In addition, all functions of the part 1002 is integrated into one chip for implementation. Alternatively, some functions is integrated into one chip for implementation and some other functions are integrated into one or more other chips for implementation. This is not limited in at least one embodiment.

For example, in response to the network device being used as the primary access point AP 1 or a related function apparatus in the AP 1, and performs the steps performed by AP 1:

In an implementation, the transceiver unit is configured to perform the steps performed by the AP 1 in S101, S103, S104, S105, S107, and/or S109 in FIG. 2, and/or other steps in at least one embodiment. The processing unit is configured to perform S106 and/or S108 in FIG. 2, and/or perform other steps in at least one embodiment.

For example, in another implementation, the transceiver unit is configured to perform the steps performed by the AP 1 in S201, S203, S204, S206, S207, S209, and/or S211 in FIG. 4, and/or other steps in at least one embodiment. The processing unit is configured to perform S208 and/or S210 in FIG. 4, and/or perform other steps in at least one embodiment.

For example, in another implementation, the transceiver unit is configured to perform the steps performed by the AP 1 in S301, S303, S304, and/or S305 in FIG. 5, and/or other steps in at least one embodiment. The processing unit is configured to perform other steps in at least one embodiment.

For example, in another implementation, the transceiver unit is configured to perform the steps performed by the AP 1 in S401, S403, S405, and/or S406 in FIG. 6, and/or other steps in at least one embodiment. The processing unit is configured to perform other steps in at least one embodiment.

For another example, in response to the network device being used as the secondary access point AP 2 or a related function apparatus in the AP 2, and performs the steps performed by the AP 2:

In an implementation, the transceiver unit is configured to perform the steps performed by the AP 2 in S101, S103, S104, S105, S107, and/or S109 in FIG. 2, and/or other steps in at least one embodiment.

The processing unit is configured to perform S102 in FIG. 2, and/or perform other steps in at least one embodiment.

For example, in another implementation, the transceiver unit is configured to perform the steps performed by the AP 2 in S201, S203, S204, S206, S207, S209, and/or S211 in FIG. 4, and/or other steps in at least one embodiment. The processing unit is configured to perform S208 and/or S210 in FIG. 4, and/or perform other steps in at least one embodiment.

For example, in another implementation, the transceiver unit is configured to perform the steps performed by the AP 2 in S301, S303, S304, S305 and/or S308 in FIG. 5, and/or other steps in at least one embodiment. The processing unit is configured to perform S208 and/or S210 in FIG. 5, and/or perform other steps in at least one embodiment.

For example, in another implementation, the transceiver unit is configured to perform the steps performed by the AP 2 in S301, S303, S304, S305 and/or S308 in FIG. 6, and/or other steps in at least one embodiment. The processing unit is configured to perform S208 and/or S210 in FIG. 6, and/or perform other steps in at least one embodiment.

For explanations and beneficial effects of related content in any one of the foregoing provided network devices and corresponding apparatus, refer to the corresponding method embodiments provided above. Details are not described herein again.

A specific implementation form of the apparatus on the primary AP side provided above is an access point AP or a station STA having a corresponding access function. For example, the apparatus is an access device or a station device, or is a chip or a function module in these devices. The foregoing methods is implemented by using software or hardware, or by executing corresponding software by hardware.

A specific implementation form of the apparatus on the secondary AP side provided above is an access point AP or a station STA having a corresponding access function. For example, the apparatus is an access device or a station device, or is a chip or a function module in these devices. The foregoing methods is implemented by using software or hardware, or by executing corresponding software by hardware.

For explanations and beneficial effects of related content in any one of the foregoing provided network devices and corresponding apparatus, refer to the corresponding method embodiments provided above. Details are not described herein again.

At least one embodiment further provides a coordinated transmission control system, including the apparatus on the primary AP side (or a STA apparatus that implements the function on the primary AP side) and the apparatus on the access AP side (or a station STA apparatus that implements the function on the secondary AP side) in the foregoing implementations.

At least one embodiment further provides a computer program product. In response to the computer program product being run on a computer, the computer is enabled to perform any method provided above.

At least one embodiment further provides a chip, where the chip stores an instruction, and in response to the instruction being run on the foregoing devices, the devices are enabled to perform the foregoing provided methods.

At least one embodiment further provides a computer storage medium, and the computer storage medium stores a computer program (instruction). In response to the program (instruction) being run on a computer, the computer is enabled to perform the method according to any one of the foregoing aspects.

All or some of the foregoing embodiments is implemented by using software, hardware, firmware, or any combination thereof. In response to a software program being used to implement the embodiments, all or some of the foregoing embodiments is implemented in a form of a computer program product. The computer program product includes one or more computer instructions. In response to the computer program instructions being loaded and executed on the computer, the procedure or functions according to at least one embodiment are all or partially generated. The computer is a general purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid state disk, SSD)), or the like.

Although described with reference to at least one embodiment, in a process of implementing embodiment described herein that claims protection, a person skilled in the art understands and implements another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor/controller or another unit implements several functions enumerated in the claims. Some measures are described in dependent claims that are different from each other, but this does not mean that these measures cannot be combined to produce a better effect.

Although described with reference to specific features and the embodiments thereof, various modifications and combinations are able to be made to them without departing from the spirit and scope of embodiments described herein. Correspondingly, the specification and accompanying drawings are merely example descriptions of embodiments defined by the accompanying claims, and is considered as any of or all modifications, variations, combinations or equivalents that cover the scope of embodiments described herein. Obviously, a person skilled in the art is able to make various modifications and variations to embodiments described herein without departing from the spirit and scope of embodiments described herein. Embodiments described herein are intended to cover these modifications and variations of embodiments described herein provided that they fall within the scope of the following claims and their equivalent technologies.

What is claimed is:

1. A coordinated transmission control method, wherein the method comprises:
    receiving, by a secondary access point (AP), a coordinated transmission request carrying negotiation parameter information from a primary AP, the negotiation parameter information comprising a quantity of spatial flows; and
    in response to determining, by the secondary AP, based on the negotiation parameter information, that the secondary AP is able to perform coordinated transmission with the primary AP, sending, by the secondary AP, first response information to the primary AP indicating that the secondary AP is able to perform coordinated transmission;
    receiving, by the secondary AP, interference test information from the primary AP, wherein the information test information is received based on a receive equalization matrix used to prevent the primary AP from causing interference to data reception performed by the secondary AP, the receive equalization matrix being selected by the secondary AP in response to a comparison between the quantity of spatial flows and a quantity of antennas of the primary AP, and a comparison between the quantity of antennas of the primary AP and a quantity of antennas of the secondary AP; and
    determining, by the secondary AP based on an interference test result of the interference test information, whether to perform coordinated transmission.

2. The method according to claim 1, wherein the method further comprises:
    in response to the secondary AP determining, based on the negotiation parameter information, not to perform coordinated transmission with the primary AP, skipping, by the secondary AP, providing a feedback to the primary AP within a preset time, or sending second response information to the primary AP indicating that the secondary AP cannot perform coordinated transmission.

3. The method according to claim 1, wherein the determining, by the secondary AP based on the interference test result of the interference test information, whether to perform coordinated transmission includes:
    in response to interference being less than or equal to a predetermined threshold, sending, by the secondary AP, a trigger frame to a to-be-scheduled second station (STA), and scheduling the second STA to perform uplink data transmission, or in response to interference being greater than the predetermined threshold, skipping sending, by the secondary AP, the trigger frame; or
    in response to interference being less than the predetermined threshold, sending, by the secondary AP, the trigger frame to the to-be-scheduled second STA, and scheduling the second STA to perform the uplink data transmission; or in response to interference being greater than or equal to the predetermined threshold, skipping sending, by the secondary AP, the trigger frame.

4. The method according to claim 3, wherein the receiving, by the secondary AP, the interference test information sent by the primary AP includes receiving the interference test information including information about a corresponding training field in a downlink data packet sent by the primary AP to a to-be-scheduled first STA; or the interference test information includes information about a corresponding field in a separate data packet sent by the primary AP before the primary AP sends a downlink data packet to the first STA.

5. The method according to claim 4, wherein in response to the interference test information including the information about the corresponding training field in the downlink data packet sent by the primary AP to the first STA, transmission of the trigger frame starts in a transmission process of the downlink data packet, and uplink data transmission of the to-be-scheduled second STA ends before transmission of a data field in the downlink data packet ends.

6. The method according to claim 1, wherein the negotiation parameter information further comprises the quantity of antennas of the primary AP.

7. The method according to claim 6, wherein the receive equalization matrix being selected by the secondary AP in response to the comparison between the quantity of spatial flows and the quantity of antennas of the primary AP, and the comparison between the quantity of antennas of the primary AP and a quantity of antennas of the secondary AP, comprises:

in response to the quantity of spatial flows being less than or equal to the quantity of antennas of the primary AP, and the quantity of antennas of the secondary AP being greater than the quantity of antennas of the primary AP, the secondary AP selects a first receive equalization matrix $W_2$ according to a first standard; and in response to the quantity of spatial flows being less than the quantity of antennas of the primary AP, and the quantity of antennas of the secondary AP being less than or equal to the quantity of antennas of the primary AP, the secondary AP selects, according to a second standard, a second receive equalization matrix $W_2'$ and a precoding matrix $Q_1$ that is used by the primary AP to send data; and before the receiving, by the secondary AP, interference test information sent by the primary AP, the method further comprises: sending, by the secondary AP, first indication information to the primary AP indicating the precoding matrix $Q_1$ used by the primary AP to send the data.

8. A coordinated transmission control apparatus, wherein the apparatus is applied to a secondary access point (AP) side, and comprises:

a memory storing an instruction; and at least one processor connected to the memory, wherein the at least one processor is configured to execute the instruction to perform operations to:

receive a coordinated transmission request from a primary AP, wherein the coordinated transmission request carries negotiation parameter information comprising a quantity of spatial flows;

in response to determining, by a secondary AP, based on the negotiation parameter information, that the secondary AP is able to perform coordinated transmission with the primary AP, send first response information to the primary AP indicating that the secondary AP is able to perform coordinated transmission;

receive interference test information from the primary AP, wherein the information test information is received based on a receive equalization matrix used to prevent the primary AP from causing interference to data reception performed by the secondary AP, the receive equalization matrix being selected by the secondary AP in response to a comparison between the quantity of spatial flows and a quantity of antennas of the primary AP, and a comparison between the quantity of antennas of the primary AP and a quantity of antennas of the secondary AP; and determine, based on an interference test result of the interference test information, whether to perform coordinated transmission.

9. The apparatus according to claim 8, wherein the at least one processor is configured to:

in response to interference being less than or equal to a predetermined threshold, send, by using the sending unit, a trigger frame to a to-be-scheduled second station (STA), and schedule the to-be-scheduled second STA to perform uplink data transmission, or in response to interference being greater than the predetermined threshold, skip sending, by using the sending unit, the trigger frame; or in response to interference being less than the predetermined threshold, send, by using the sending unit, the trigger frame to the to-be-scheduled second STA, and schedule the to-be-scheduled second STA to perform the uplink data transmission; or in response to interference being greater than or equal to the predetermined threshold, skip sending, by using the sending unit, the trigger frame; and send or skip sending the trigger frame.

10. The apparatus according to claim 9, wherein the negotiation parameter information further comprises the quantity of antennas of the primary AP.

11. The apparatus according to claim 10, wherein the receive equalization matrix being selected by the secondary AP in response to the comparison between the quantity of spatial flows and the quantity of antennas of the primary AP, and the comparison between the quantity of antennas of the primary AP and a quantity of antennas of the secondary AP, comprises:

in response to the quantity of the spatial flows being less than or equal to the quantity of the antennas of the primary AP, and the quantity of antennas of the secondary AP being greater than the quantity of the antennas of the primary AP, the secondary AP selects a first receive equalization matrix $W_2$ according to a first standard; and in response to the quantity of spatial flows being less than the quantity of the antennas of the primary AP, and the quantity of the antennas of the secondary AP being less than or equal to the quantity of antennas of the primary AP, the secondary AP selects, according to a second standard, a second receiving equalization matrix $W_2'$ and a precoding matrix $Q_1$ that is used to prevent the primary AP from causing interference to data reception performed by the secondary AP; and after determining $Q_1$, send first indication information to the primary AP, indicating $Q_1$.

12. A coordinated transmission control apparatus, wherein the apparatus is applied to a primary access point (AP) side, and comprises:
- a memory storing an instruction; and
- at least one processor connected to the memory, wherein the at least one processor is configured to execute the instruction to perform operations to:
  - send a coordinated transmission request to a secondary AP, wherein the coordinated transmission request carries negotiation parameter information comprising a quantity of spatial flows;
  - in response to determining, by the secondary AP, based on the negotiation parameter information, that the secondary AP is able to perform coordinated transmission with the primary AP, receiving first response information sent by the secondary AP indicating that the secondary AP is able to perform coordinated transmission;
  - send interference test information to the secondary AP, wherein the information test information is received based on a receive equalization matrix used to prevent the primary AP from causing interference to data reception performed by the secondary AP, the receive equalization matrix being selected by the secondary AP in response to a comparison between the quantity of spatial flows and a quantity of antennas of the primary AP, and a comparison between the quantity of antennas of the primary AP and a quantity of antennas of the secondary AP, wherein the interference test information is used by the secondary AP to perform an interference test to determine whether to perform coordinated transmission.

13. The apparatus according to claim 12, wherein the at least one processor is configured to:
receive first indication information from the secondary AP, wherein the first indication information indicates a precoding matrix $Q_1$ used by the primary AP to send data, and
send the interference test information by using $Q_1$.

14. The method according to claim 4, wherein
in response to the interference test information including the information about the corresponding training field in the downlink data packet sent by the primary AP to the first STA, transmission of the trigger frame starts in a transmission process of the downlink data packet, and uplink data transmission of the to-be-scheduled second STA ends at the same time the transmission of the data field in the downlink data packet ends.

15. The method according to claim 4, wherein
in response to the interference test information including the information about the corresponding field in the separate data packet sent by the primary AP to the first STA, transmission of the trigger frame starts before transmission of the data field in the downlink data packet sent by the primary AP to the first STA ends, and the uplink data transmission of the to-be-scheduled second STA ends before the transmission of the data field in the downlink data packet ends.

16. The method according to claim 4, wherein
in response to the interference test information including the information about the corresponding field in the separate data packet sent by the primary AP to the first STA, transmission of the trigger frame starts before transmission of the data field in the downlink data packet sent by the primary AP to the first STA ends, and the uplink data transmission of the to-be-scheduled second STA ends at the same time the transmission of the data field in the downlink data packet ends.

* * * * *

UNITED STATES PATENT AND TRADEMARK OFFICE
CERTIFICATE OF CORRECTION

| | | |
|---|---|---|
| PATENT NO. | : 12,368,477 B2 | |
| APPLICATION NO. | : 18/317619 | |
| DATED | : July 22, 2025 | |
| INVENTOR(S) | : Xiangbai Liao et al. | |

It is certified that error appears in the above-identified patent and that said Letters Patent is hereby corrected as shown below:

In the Specification

Column 6, Line 61-65 should be replaced with the following:
In at least one embodiment, the first standard is $W_2H_{21}=0$, where $H_{21}$ is channel estimation information between the primary AP and the secondary AP; and the second standard is $W_2'H_{21}Q_1=0$, where $H_{21}$ is channel estimation information between the primary AP and the secondary AP.

Signed and Sealed this
Twenty-eighth Day of October, 2025

John A. Squires
*Director of the United States Patent and Trademark Office*